(12) United States Patent  
Cosentino et al.

(10) Patent No.: US 11,345,621 B2  
(45) Date of Patent: May 31, 2022

(54) SELF-TREATING ELECTROLYTIC BIOCIDE GENERATING SYSTEM WITH RECIRCULATION

(71) Applicant: ElectroSea, LLC, Wayzata, MN (US)

(72) Inventors: Louis Ciro Cosentino, Palm Beach Gardens, FL (US); Daniel L. Cosentino, Wayzata, MN (US); Brian Alan Golden, Eden Prairie, MN (US)

(73) Assignee: Electrosea, LLC, Wayzata, MN (US)

( * ) Notice: Subject to any disclaimer, the term of this patent is extended or adjusted under 35 U.S.C. 154(b) by 107 days.

(21) Appl. No.: 16/787,379

(22) Filed: Feb. 11, 2020

(65) Prior Publication Data

US 2020/0255306 A1 Aug. 13, 2020

Related U.S. Application Data

(60) Provisional application No. 62/875,876, filed on Jul. 18, 2019, provisional application No. 62/831,518, (Continued)

(51) Int. Cl.
*C02F 1/00* (2006.01)
*C02F 1/46* (2006.01)
(Continued)

(52) U.S. Cl.
CPC ............ *C02F 1/4674* (2013.01); *B01D 36/00* (2013.01); *B01D 37/043* (2013.01); *B63J 1/00* (2013.01);
(Continued)

(58) Field of Classification Search
CPC .... C02F 1/4674; C02F 1/46104; C02F 1/004; C02F 2103/008; C02F 2103/08;
(Continued)

(56) References Cited

U.S. PATENT DOCUMENTS 2,712,871 A * 7/1955 Schmid .................. B01D 35/12
210/341
3,010,886 A 11/1961 Chappell
(Continued)

FOREIGN PATENT DOCUMENTS

DE 10 2004 005 303 A1 8/2005
EP 2 394 965 A1 12/2011
(Continued)

OTHER PUBLICATIONS

International Search Report dated Jun. 8, 2020 in PCT/US2020/017470, 16 pages.
(Continued)

*Primary Examiner* — Joseph W Drodge
(74) *Attorney, Agent, or Firm* — Merchant & Gould P.C.

(57) ABSTRACT

The present disclosure relates to a biocide generating system for inhibiting bio-fouling within a water system of a watercraft. The water system is configured to draw water from a body of water on which the watercraft is supported. The biocide generating system includes an electrode arrangement adapted to be incorporated as part of an electrolytic cell through which the water of the water system flows. The water system is configured such that biocide treated water also flows to one or more components of the water system that are positioned upstream of the electrode arrangement.

22 Claims, 19 Drawing Sheets

Related U.S. Application Data filed on Apr. 9, 2019, provisional application No. 62/803,955, filed on Feb. 11, 2019.

(51) Int. Cl.

| | |
|---|---|
| *B01D 36/00* | (2006.01) |
| *B01D 37/04* | (2006.01) |
| *B63J 1/00* | (2006.01) |
| *C02F 1/467* | (2006.01) |
| *C02F 1/461* | (2006.01) |
| *C02F 103/00* | (2006.01) |
| *C02F 103/08* | (2006.01) |

(52) U.S. Cl.
CPC .......... *C02F 1/46104* (2013.01); *C02F 1/004* (2013.01); *C02F 2103/008* (2013.01); *C02F 2103/08* (2013.01); *C02F 2201/001* (2013.01); *C02F 2201/008* (2013.01); *C02F 2201/46145* (2013.01); *C02F 2303/20* (2013.01)

(58) Field of Classification Search
CPC .......... C02F 2201/001; C02F 2201/008; C02F 2201/46145; C02F 2303/20; C02F 2209/40; C02F 1/001; C02F 1/008; C02F 1/4602; C02F 1/461; C02F 1/467; C02F 1/4672; C02F 1/76; C02F 2201/460105; C02F 2201/4611; C02F 2201/46119; C02F 2201/4612; C02F 2201/4613; C02F 2301/04; C02F 2301/046; C02F 2303/04; B63B 59/04; B63J 2/12; B63J 1/00; B63J 2/00; B63J 4/00; B63J 4/002; B01D 35/02; B01D 35/027; B01D 35/28; B01D 36/00; B01D 36/04; B01D 37/00; B01D 37/04; B01D 37/043; B01D 2221/08

See application file for complete search history.

(56) References Cited

U.S. PATENT DOCUMENTS

| | | | | |
|---|---|---|---|---|
| 3,241,512 | A * | 3/1966 | Green | C02F 1/4674 |
| | | | | 114/222 |
| 3,458,413 | A | 7/1969 | Ueda et al. | |
| 4,009,104 | A * | 2/1977 | Behrendt | B63J 4/004 |
| | | | | 210/744 |
| 4,173,525 | A | 11/1979 | Nakamatsu et al. | |
| 4,488,945 | A | 12/1984 | Spaziante | |
| 5,807,473 | A | 9/1998 | Sadler et al. | |
| 5,853,562 | A | 12/1998 | Eki et al. | |
| 6,716,325 | B2 | 4/2004 | Bentley | |
| 6,821,398 | B2 | 11/2004 | Von Broembsen | |
| 8,163,141 | B2 | 4/2012 | Von Broembsen | |
| 8,591,740 | B2 * | 11/2013 | Nupnau | G01N 17/008 |
| | | | | 210/636 |
| 8,968,575 | B2 | 3/2015 | Zolotarsky et al. | |
| 11,027,991 | B2 * | 6/2021 | Cosentino | C02F 1/46104 |
| 2003/0024809 | A1 | 2/2003 | Broembsen | |
| 2004/0060876 | A1 * | 4/2004 | Tipton | B63J 4/002 |
| | | | | 210/748.16 |
| 2004/0065614 | A1 * | 4/2004 | Gordon | B01F 5/0688 |
| | | | | 210/650 |
| 2004/0099608 | A1 * | 5/2004 | Leffler | C02F 1/4672 |
| | | | | 210/704 |
| 2005/0173262 | A1 | 8/2005 | Nakanishi | |
| 2006/0169645 | A1 * | 8/2006 | Hsueh | C02F 1/4674 |
| | | | | 210/739 |
| 2007/0095732 | A1 | 5/2007 | Lutz | |
| 2007/0108056 | A1 | 5/2007 | Nyberg | |
| 2008/0000775 | A1 | 1/2008 | Childers, II et al. | |
| 2008/0164217 | A1 * | 7/2008 | Nishizawa | B63J 4/002 |
| | | | | 210/747.6 |
| 2009/0211918 | A1 | 8/2009 | Hardee | |
| 2009/0229992 | A1 | 9/2009 | Sanchez et al. | |
| 2010/0213049 | A1 | 8/2010 | Burtsch | |
| 2011/0100885 | A1 * | 5/2011 | Lee | B01D 29/684 |
| | | | | 210/85 |
| 2011/0139729 | A1 * | 6/2011 | Nupnau | C02F 1/46 |
| | | | | 210/749 |
| 2011/0226704 | A1 * | 9/2011 | Matousek | C02F 1/4674 |
| | | | | 210/748.17 |
| 2013/0087450 | A1 | 4/2013 | Antozzi et al. | |
| 2015/0190742 | A1 * | 7/2015 | Jensen | B01D 35/306 |
| | | | | 210/236 |
| 2016/0130165 | A1 | 5/2016 | Park | |
| 2017/0152162 | A1 | 6/2017 | Cam | |
| 2017/0240263 | A1 * | 8/2017 | Kanazawa | B63J 4/002 |
| 2019/0023596 | A1 | 1/2019 | Trela | |
| 2019/0106339 | A1 * | 4/2019 | Cosentino | C02F 1/46104 |
| 2020/0017379 | A1 | 1/2020 | Nakayama | |
| 2020/0325041 | A1 * | 10/2020 | Cosentino | C02F 1/46104 |

FOREIGN PATENT DOCUMENTS

| | | |
|---|---|---|
| KR | 10-0663332 B1 | 1/2007 |
| WO | WO 2010/022057 A1 | 2/2010 |
| WO | 2014016038 A1 | 1/2014 |
| WO | 2014129710 A1 | 8/2014 |
| WO | 2017017462 A1 | 2/2017 |
| WO | 2018102623 A1 | 6/2018 |
| WO | WO 2019/070877 | 4/2019 |

OTHER PUBLICATIONS

Abdel-Aal et al., "Hydrogen Production Using Sea Water Electrolysis," The Open Fuel Cells Journal, vol. 3, pp. 1-7 (2010).
About our Equipment, http://electrichlor.com/equipment/, Electrichlor, 4 pages (Copyright 2012).
Assessment of the Effects of Chlorinated Seawater from Power Plants on Aquatic Organisms, Interagency Energy/Environment R&D Program Report, Environmental Protection Agency, EPA-600/7-28-221, 76 pages (Nov. 1978).
AS-US Standard Brochure, Arctic Steel, 4 pages (Feb. 2016).
Carson, "CircuPool RJ Series Salt Chlorine Generator," Pool Product Magazine, http://www.poolproductreviewsmagazine.com/, 4 pages (Jun. 2009).
Cathelco Cathodic Protection Systems in Australia by Marine Plant Systems, Marine Plant Systems Pty Ltd., pp. 1-6 (Mar. 23, 2017).
Chaplin, "Electrolysis of Water," http://www1.lsbu.ac.uk/phpcgiwrap/water/pfp.php3?page=http://www1.lsbu.ac.uk/water/electrolysis.html, pp. 1-5 (Feb. 27, 2017).
Chemistry of Sea Water, Chapter VI, pp. 165-227.
Chemtrol Pool Control—Chemical Automation, http://www.sbcontrol.com/salt_generators.htm, pp. 1-3 (Date Downloaded Jan. 23, 2017).
Chen et al., $Ti/RuO_2$—$Sb_2O_5$—$SnO_2$ electrodes for chlorine evolution from seawater, Chemical Engineering Journal, vol. 172, pp. 47-51 (2011).
Chlorine Analyser, http://www.turtletough.com.au/product/chlorine-analyser-2/#woocommerce-tabs3, pp. 1-4 (Mar. 6, 2017).
Chlorine Analyzer for Chlorine Dosing Control, http://www.processinstruments.net/products/chlorine-analyzer/?gclid=CIuGzpKq19ECFcVEhgodPkMH3w, pp. 1-2 (Jan. 23, 2017).
Chlorine Generator, http://www.doheny.com/poolsupplies/ChlorineGenerator5742.html?adpos=1o6&creative=116116201388&device=c&matchtype=&network=g&gclid=CjwKEAiA, 2 pages (Copyright 2015).
Chlorine Measurement by Amperometric Sensor, Application Data Sheet, Emerson Process Management, ADS 43-6063/rev.B, 3 pages (Feb. 2009).
CircuPool RJ Plus Series Electronic Chlorine Generator Owner's Manual, CircuPool Products, pp. 1-29.
CircuPool RJ-30 Classic Replacement Cell, http://www.discountsaltpool.com/CircuPool-RJ-30-Classic-Replacement-Salt-Cell.phpk, pp. 1-2 (Jan. 15, 2017).
Clomburg et al,. Industrial biomanufacturing: The future of chemical production, Science, vol. 355, 12 pages (Jan. 6, 2017).

(56) References Cited

OTHER PUBLICATIONS

Compu-Chlor Auto Cleaning Replacement Cells, http://www.compupool.com.au/product/genuine_cells_auto.htm, 1 page (Jan. 15, 2017).
CPSC Series Auto Cleaning Replacement Cells, http://www.compupool.com.au/product/genuine_cells_cpsc.html, 1 page (Jan. 15, 2017).
Current Limiting, Apex Manufacturing, Inc., www.apexanalog.com, AN09U RevE, pp. 1-3 (Oct. 2012).
Driving Capacitive Loads, Apex Manufacturing, Inc. www.apexanalog.com, AN25U RevG, pp. 1-19 (Oct. 2012).
DX Seawater Pumps Reliable & Heavy-duty Centrifugal Pumps, Domestic Murine, ISO 9001-2008, 2 pages (Feb. 26, 2010).
Effects of Wastewater and Cooling Water Chlorination on Aquatic Life, Enviromental Protection Agency, EPA-600/3-76-098, 54 pages (Aug. 1976).
Electrolytic Cells, http://chemed.chem.purdue.edu/genchem/topicreview/bp/ch20/faraday.php, pp. 1-10 (Date Downloaded Feb. 26, 2017).
Evaluation Kit, Apex Manufacturing, Inc., www.apexanalog.com, EK27U Rev F, pp. 1-9 (Dec. 2015).
Flat Plate vs. Round, Electrichlor, http://electrichlor.com/flat-plate-vs-round/, pp. 1-4 (Copyright 2012).
General Operating Considerations, Apex Manufacturing, Inc., www.apexanalog.com, AN01U RevJ, pp. 1-13 (Oct. 2012).
GENH30-25, TDK-Lambda Americas-Inc, https://www.genesysdcstore.com/collections/120-volt-options/products/genh30-26, pp. 1-6 (Copyright 2017).
Genuine CircuPool® Replacement Parts, http://circupool.mybigcommerce.com/parts/?sort=featured&page=2, pp. 1-2 (Date Downloaded Jan. 15, 2017).
Grandison et al., "A Review of Marine Growth Protection System (MGPS) Options for the Royal Australian Navy," Maritime Platforms Division, DSTO-TR-2631, 38 pages (Dec. 2011).
Hsu et al., "Effects of electrode settings on chlorine generation efficiency of electrolyzing seawater," Journal of Food and Drug Analysis, vol. 23, pp. 729-734 (2015).
Hypochlorite Generators, Electrichlor, http://electrichlor.com/mariners/, pp. 1-4 (Copyright 2012).
Hypopac Concentric Tubular Cell, http://titanindia.com/hypopac-concentric-tubular-cell.html, pp. 1-3 (Copyright 2016).
IntelliChlor® Electronic Chlorine Generator (Model IC60, IC40, IC20) Installation and User's Guide, 48 pages (Copyright 2009).
International Search Report and Written Opinion for Application No. PCT/US2018/054200 dated Dec. 21, 2018.
Iridium Coated Titanium Anodes: Sources, Anticipated Life, Applications, http://www.finishing.com/141/64.shtml, pp. 1-9 (Copyright 1995-2016).
Kraft et al., "Electrochemical water disinfection Part I: Hypochlorite production from very dilute chloride solutions," Journal of Applied Electrochemistry, vol. 29, Issue 7, pp. 859-866 (Jul. 1999).
Liang et al., "Research on Electrochemical Behavior of Ti—Ir—Ru Anode Coating in Electrolytic Antifouling of Flowing Brine," Journal of Materials Engineering and Performance, vol. 18, No. 8, pp. 1086-1090 (Nov. 2009).
Macdonald et al., The Interaction of Chlorine and Seawater, Pacific Marine Science Report 77-6, 55 pages (Feb. 1977).
Manasfi et al., "A Comparison Between Freshwater and Seawater Swimming Pools: From Disinfection By-products Profile to Genotoxicity," 6th International Conference on Swimming Pool and Spa Conference, 9 pages (Mar. 2015).
Marine (Offshore) Application Electrochlorination System, http://www.qdmis.com/marine-offshore-electro-chlorinator_p54.html, pp. 1-8 (Copyright 2015-2017).
McPherson, "Amperometric vs. colorimetric methods for on-line measurement of chlorine," WaterWorld, http://www.waterworld.com/articles/print/volume-28/issue-8/editorial-features/amperometric-vs-colorimetric-methods-for-on-line-measurement-of-chlorine.html, 5 pages (Mar. 6, 2017).
Memo: Formation and effect of seawater chlorination by-products in relation with the chlorination of Hammerfest LNG cooling-water, 14 pages.
Oh et al., "Evaluation of a seawater electrolysis process considering formation of free chlorine and perchlorate," Desalination and Water Treatment, vol. 18, pp. 245-250 (Jun. 2010).
On-Board Waste Treatment LECTRA/SAN MC, http://raritaneng.com/onboardwastetreatmentlectrasanmc/, pp. 1-4 (Copyright 2017).
Operational Amplifier Basics, Apex Manufacturing, Inc. www.apexanalog.com, AN31U RevD, pp. 1-3 (Oct. 2012).
OpimumOxides™ Data Sheet, Optimum Anode Technologies, Inc., 4 pages (Copyright 2012).
Pentair Rainbow 320 Automatic In-Line Chlorine/Bromine Feeder, http://www.poolsupplyworld.com/pentair-Rainbow-320-Automatic-In-Line-ChlorineBromine-Feeder/R171096.htm?xzm2&ecmpid=aw_pla_search_R171096&a, pp. 1-5 (Copyright 2016).
Pikaar et al., "Electrochemical sulfide oxidation from domestic wastewater using mixed metalcoated titanium electrodes," Water Research, vol. 45, Issue 17, pp. 5381-5388 (Nov. 2011).
PM224 MOSFET Power Amplifier Module PM224HV MOSFET High Voltage Power Amplifier Module, http://www.marchandelec.com/pm224.html, pp. 1-2 (Date Downloaded Feb. 12, 2017).
Polman et al., "Results and Benefits of the Adoption of Pulse-Chlorination® for Industrial Cooling Seawater Antifouling at Qatargas, Ras Laffan Industrial City, Qatar," pp. 1-9 (2012).
Power Amp Output Impedance, Apex Manufacturing, Inc., www.apexanalog.com, AN10U RevD, pp. 1-2 (Oct. 2012).
Power Amplifier Support Components, Apex Manufacturing, Inc. www.apexanalog.com, AN PA50U RevB, pp. 1-2 (Nov. 2012).
Power Operational Amplifier, Apex Manufacturing, Inc. www.apexanalog.com, PA50U RevJ, 4 pages (Jan. 2015).
Programmable Power Supplies, Apex Manufacturing, Inc., www.apexanalog.com, AN07U RevE, pp. 1-3 (Oct. 2012).
Rajaopal, S. "Chlorination and Biofouling Control in Industrial Cooling Water Systems," Chapter 8, Operational and Environmental Consequences of Large Industrial Cooling Water Systems, pp. 163-182 (2012).
Regulated Adjustable DC Power Supply HY5020EX 50V 20A Over-Voltage Reverse-Voltage Protection, http://www.volteq.com/volteq-power-supply-hy5020ex-50v-20a-over-voltage-over-current-protection.html, pp. 1-6 (Copyright 2006).
RS-150 Series 150W Single Output Switching Power Supply, 2 pages (Jul. 8, 2015).
Ru—ir coated titanium electrode assembly for salt water electrolysis, http://www.bjchangli.com.cn/product/1731406881-220830537/Ru_Ir_coated_titanium_electrode_assembly_for_salt_water_electrolysis.html, pp. 1-7 (Copyright 1999-2016).
Saleem, "Biofouling Management in the Cooling Circuit of a Power Industry Using Electrochemical Process," J. Chem. Soc. Pak, vol. 33, No. 3, pp. 295-304 (2011).
Salt water chlorination, Wikipedia, https://en.m.wikipedia.org/wiki/Salt_water_chlorination, pp. 1-7 (Date Downloaded Jan. 15, 2017).
Seawater chlorination systems, http://www.titanindia.com/seawater-chlorination-systems.html, pp. 1-3 (Date Downloaded Jan. 15, 2017).
Seawater Electrochlorination Systems, De Nora Water Technologies, pp. 1-8 (Copyright 2015).
Single Supply Operation of Power Operational Amplifiers, Apex Manufacturing, Inc. www.apexanalog.com, AN21U RevD, pp. 1-6 (Oct. 2012).
Tsolaki et al., "Technologies for ballast water treatment: a review," J. Chem. Technol. Biotechnol., vol. 85, pp. 19-32 (2010).
Turbo Cell & Control Electronics, Pro Logic Version Rev. 4.45 Diagnostics Manual, 42 pages (Copyright 2014).
Vallet et al., "A study of the failure mechanism of chlorine anodes," Electrochemical Society Proceedings, vol. 95-11, pp. 338-360 (1995).
Voltage to Current Conversion, Apex Manufacturing, Inc., www.apexanalog.com, AN13U RevF, pp. 1-4 (Aug. 2013).
Wallis, "The maintenance of satisfactory water conditions in dolphinaria," Aquatic Mammals, vol. 1, No. 3, pp. 19-25 (1972).
Webb, "Scale Problems in Saltwater Pools,"4 pages (Feb. 2011).

(56) References Cited

OTHER PUBLICATIONS

What is Electrochlorination?, http://www.evoqua.com/en/brands/Electrocatalytic/Pages/what-is-electrochlorination.aspx, pp. 1-2 (Date Downloaded Jan. 15, 2017).

* cited by examiner

SELF-TREATING ELECTROLYTIC BIOCIDE GENERATING SYSTEM WITH RECIRCULATION

CROSS REFERENCE TO RELATED APPLICATIONS

The present application claims the benefit of U.S. Provisional Patent Application No. 62/803,955, filed Feb. 11, 2019, U.S. Provisional Patent Application No. 62/831,518, filed Apr. 9, 2019, and U.S. Provisional Patent Application No. 62/875,876, filed Jul. 18, 2019, the disclosures of which are hereby incorporated by reference herein in their entirety.

TECHNICAL FIELD

The present disclosure relates generally to biocide generating systems for reducing or eliminating biofouling within water systems. More particularly, the present disclosure relates to an anti-biofouling system for treating the water of an on-board water system of a watercraft.

BACKGROUND

Watercraft, particularly marine watercraft, often include on-board water systems which use water drawn from the bodies of water on which the watercraft are buoyantly supported. A prevalent type of on-board water system is configured to pass drawn water through a heat exchanger used to cool refrigerant associated with air conditioning systems, chillers, and the like. Other on-board water systems include potable water systems, sanitation systems, propulsion systems, engine cooling systems, bait-well filling systems and systems corresponding to ancillary equipment. Bio-fouling caused by bio-growth (e.g., marine growth) can result in the clogging of on-board water systems, and the inefficient operation, overheating, and malfunction of equipment dependent upon the water systems thereby leading to costly downtime and expensive repair. Commonly, the issue of bio-growth within on-board water systems is addressed by periodic (e.g., semi-annual) acid cleaning of the water systems. Acid cleaning is expensive, time consuming, and involves the use of harsh and hazardous chemicals. Improvements in this area are needed.

The contents of International Patent Application No. PCT/US2018/054200 filed Oct. 3, 2018 are hereby fully incorporated by reference in their entirety.

SUMMARY

One aspect of the present disclosure relates to a self-treating biocide generating system of an on-board water system of a watercraft. The biocide generating system functions to inhibit biofouling within the on-board water system such that related equipment (e.g., a heat exchanger) of the watercraft can be operated at peak performance with minimal to no downtime. The biocide generating system is configured such that each component of the on-board water system, including each component of the biocide generating system, that is exposed to water during normal operation of the on-board water system is also periodically treated with biocide generated by the biocide generating system. In this manner, the biocide generating system not only treats the water-reliant components that are downstream of the biocide generating system (e.g., a heat exchanger used to cool refrigerant associated with air conditioning systems, chillers, and the like, a sanitation system, a propulsion system, an engine cooling system, etc.), but also components of the onboard water system that may be positioned upstream of the biocide generating system, such as a water intake or port, a strainer that strains water being drawn into the onboard water system, etc.

In certain examples, the biocide generating system can include at least one or at least two electrolytic modules for providing the in situ generation of biocide within the water passing through the on-board water system. In certain examples, the biocide generating system can be continuously operated or intermittently operated. In certain examples, a biocide generating system in accordance with the principles of the present disclosure eliminates the need for acid cleaning of the on-board water system, or substantially reduces the frequency that acid cleaning of the on-board water system is required.

In certain examples, the biocide generating system is configured to operate in multiple modes. In a cleaning or purging mode, the biocide generating system is used to eliminate organisms (e.g., marine growth such as mollusks, barnacles, etc.) already present in the on-board water system, including the biocide generating system. In a maintenance mode, the biocide generating system operates to flush biocide through the on-board water system to prevent or reduce future marine growth. In some examples, the concentration of biocide within the on-board water system is higher during the purging mode than it is during the maintenance mode. For example, if the biocide generating system includes more than one electrolytic module, more of the modules can be active during the cleaning mode than during the maintenance mode to thereby generate a greater amount of biocide to increase the concentration of biocide in the water flowing through the on-board water system. Alternatively, more current can be supplied to the electrode arrangement during the cleaning mode than in maintenance mode to generate a higher concentration of biocide in purging mode. In some examples, a watercraft is constructed with a biocide generating system according to the present disclosure integrated therein. In other examples, a watercraft is retrofitted with a biocide generating system in accordance with the present disclosure. Particularly in the case of a retrofitted watercraft, it can be advantageous to initially operate the biocide generating system in a cleaning mode to purge biological buildup in the on-board water system that developed before installation of the biocide generating system. Thereafter, the biocide generating system can be operated in maintenance mode to inhibit further biofouling of the on-board water system.

Operating the biocide generating system in purging mode can be particularly advantageous when a watercraft that has already spent time in the water is retrofitted with the biocide generating system. In these situations, biomaterial in the on board water system that already accumulated prior to the installation of the biocide generating system is killed by the biocide, releasing the biomaterial debris (e.g., barnacles, shells) into the flow stream of the onboard water system. The released, and therefore mobile, debris can clog, damage or cause faults or malfunctions in components of the onboard water system. Stray mobile debris can likewise cause similar problems even when the system is not in purging mode, for example, when the system is running in maintenance mode.

For example, a flow meter positioned to detect flow out of the biocide generating system can become clogged or damaged by such debris, resulting in false flow readings and inappropriate corrective measures being taken. In some examples, a secondary or supplemental strainer is positioned at or near the flow output of the biocide generating system to collect such debris and help to reduce damage that may otherwise be caused by such debris. In some examples, the secondary strainer is installable in and removable from (e.g., to discard collected debris) the biocide generator without dismantling plumbing (e.g., pipes, valves) or other components of the on board water system. For example, a canister housing the biocide generator is simply opened and the secondary strainer is installed in or removed from (permanently or temporarily) the outlet of the biocide generating system. Once installed, the biocide generating system can be, e.g., operated in purging mode to remove any preexisting biofouling in the onboard water system of the retrofitted watercraft. Once purging mode is complete, optionally the secondary strainer is removed to remove the collected debris from the on-board water system. The secondary strainer can then be returned to the biocide generating system for filtering during maintenance mode and/or or further subsequent purging mode.

An on-board water system (or simply "water system") in accordance with the present disclosure is configured to draw water from a body of water (also referred to herein as a "water source") on which the watercraft is buoyantly supported. In some examples the water source contains saltwater and the biocide generating system uses the saltwater (e.g., seawater, brackish water) to generate biocide via electrolysis, in which case the on-board water system is installed on a seaworthy watercraft and the water source supplies salt water (e.g., seawater) to the on-board water system. In at least some of these examples, the biocide generated by the biocide generating system is or at least partially consists of chlorine. In other examples, the biocide generating system uses water from fresh water sources (e.g., lakes, rivers) to generate biocide via electrolysis.

The biocide generating system includes an electrode arrangement adapted to be incorporated as part of an electrolytic cell through which the water from the water source flows. The biocide generating system also includes a flow sensor for sensing a rate of water flow out of the electrolytic cell and a control system that interfaces with the electrode arrangement. An example flow sensor can include a flow meter such as a hall-effect flow sensor (e.g., an electronic paddle flow meter). The control system includes an electrical power circuit for establishing a flow of electrical current between first and second electrodes of the electrode arrangement to generate a biocide in the water which flows through the electrolytic cell. The control system also includes a gas sensing circuit for detecting when gas collects in the electrolytic cell. In some examples, the control system varies a magnitude of the electrical current established between electrodes of the electrode arrangement in direct relation to the rate of water flow sensed by the flow sensor. For example, a processor can increase the constant electrical current with an increase in the water flow rate and decrease the constant electrical current with a decrease in the water flow rate so as to maintain a constant biocide concentration (or at least a biocide concentration within a target range) in the water flowing along the flow path.

The control system can be configured to terminate the generation of biocide when the collection of gas is detected. If any of one or more flow monitoring means provides an indication that no flow is occurring within the system, the control system can disable the electrolytic cell. For example, if the flow sensor provides a no-flow indication to the control unit or the gas sensing system provides an indication to the control unit that gas is collecting at the electrolytic cell, the control unit will disable the electrolytic cell. In addition, the control system can include one or more sensors, such as temperature sensors and/or flow sensors, and its/their output(s) used by the control system to actively control the amount of biocide being produced.

In some examples, the control system also is adapted to determine when water is not flowing through the water system, and to terminate the generation of biocide when it has been determined that water is not flowing through the water system. As mentioned, the control system can determine whether water is flowing through the water system by various means such as sensors (e.g., gas collection sensors, flow sensors, etc.) or by monitoring the operational status (e.g., on or off) of the system pump or pumps or by one or more flow sensors. When the control system determines that water is no longer flowing through the water system, the control system preferably terminates the generation of biocide by terminating power to the electrode arrangement. The control system can terminate the generation of biocide immediately after it has been established that water is no longer flowing through the water system. Alternatively, the control system can allow the system to continue to generate biocide for a predetermined time after water flow has ceased and then terminate the generation of biocide after the predetermined time has expired.

One or more flow sensors or pressure sensors can be positioned within the flow path to detect flow at different locations along the flow path. In some examples, one or more flow sensors is/are configured to provide a binary output, e.g., that flow either is or is not detected. In some examples, a flow sensor that is a flow meter is provided, which provides a metered output, e.g., an amount of flow detected. In some examples, a flow meter is positioned at or around the flow output of the biocide generating system, to detect and provide to the control system metered flow data out of the biocide generating system. This data can be used to ascertain whether sufficient biocide is being supplied to the onboard water system, the associated pump, water inputs and outputs (e.g., through-hull fittings), primary strainer, etc.

In accordance with certain aspects of the present disclosure, there is provided a biocide generating system for inhibiting bio-fouling within a water system of a watercraft, the water system being configured to draw water from a water source on which the watercraft is supported through at least a first port positioned in a body or hull of the watercraft, the biocide generating system defining an upstream to downstream direction corresponding to a direction of flow when water is being drawn through the first port into the water system, the biocide generating system comprising: an electrode arrangement adapted to be incorporated as part of an electrolytic cell through which water drawn from the water source flows; a strainer through which water drawn through the first port flows, the strainer being positioned upstream of the electrode arrangement; and a recirculation conduit having a first end positioned downstream of the electrode arrangement and a second end positioned to feed water containing biocide to the strainer. In some examples, the second end of the recirculation conduit is positioned at the strainer. In some examples, the second end of the recirculation conduit is positioned upstream of the strainer.

In accordance with further aspects of the present disclosure, there is provided a biocide generating system for inhibiting bio-fouling within a water system of a watercraft, the water system being configured to draw water from a water source on which the watercraft is supported through at least a first port positioned in a body or hull of the watercraft, the biocide generating system defining an upstream to downstream direction corresponding to a direction of flow when water is being drawn through the first port into the water system, the biocide generating system comprising: an electrode arrangement adapted to be incorporated as part of an electrolytic cell through which water drawn from the water source flows; and a recirculation conduit having a first end positioned downstream of the electrode arrangement and a second end positioned proximate the first port such that the recirculation conduit is configured to discharge water containing biocide through the first port.

In accordance with further aspects of the present disclosure, there is provided a biocide generating system for inhibiting bio-fouling within a water system of a watercraft, the water system being configured to draw water from a water source on which the watercraft is supported through at least a first port positioned in a body or hull of the watercraft, the biocide generating system defining an upstream to downstream direction corresponding to a direction of flow when water is being drawn through the first port into the water system, the biocide generating system comprising: an electrode arrangement adapted to be incorporated as part of an electrolytic cell through which water drawn from the water source flows; a strainer through which water drawn through the first port flows, the strainer being positioned upstream of the electrode arrangement; and a recirculation conduit having a first end positioned downstream of the electrode arrangement and a second end positioned at or upstream of the strainer such that the recirculation conduit feeds water containing biocide to the strainer and discharges water containing biocide through the first port.

In certain examples, at least one controllable pump is used to perform the drawing of the water through the first port, the feeding of the water containing biocide to the strainer, and/or the discharging of the water containing biocide through the first port.

In certain examples, at least two controllable pumps are used to perform the drawing of the water through the first port, the feeding of the water containing biocide to the strainer, and/or the discharging of the water containing biocide through the first port.

In accordance with further aspects of the present disclosure, there is provided a biocide generating system for inhibiting bio-fouling within a water system of a watercraft, the water system being configured to draw water from a water source on which the watercraft is supported through each of a first port and a second port positioned in a body or hull of the watercraft, comprising: an electrode arrangement adapted to be incorporated as part of an electrolytic cell through which water drawn from the water source through each of the first and the second ports flows; a first strainer through which water drawn through the first port flows before reaching the electrode arrangement; a second strainer through which water drawn through the second port flows before reaching the electrode arrangement; a first recirculation conduit configured to feed water containing biocide generated by the electrolytic cell to the first strainer; and a second recirculation conduit configured to feed water containing biocide generated by the electrolytic cell to the second strainer. In some examples, the first recirculation conduit is further configured to discharge water containing biocide generated by the electrolytic cell through the first port. In some examples, the second recirculation conduit is also configured to discharge water containing biocide through the second port.

In certain examples, a controllable pump is used to perform the drawing of the water through the first and second ports, and/or the feeding of the water containing biocide to the first and second strainers, and/or the discharging of the water containing biocide through the first and second ports, the controllable pump being operable in a forward mode in which the pump acts to draw water from the water source into the water system through the first port and a reverse mode in which the pump acts to draw water from the water source into the water system through the second port.

In certain examples, at least first and second controllable pumps are used to perform the drawing of the water through the first and second ports, and/or the feeding of the water containing biocide to the first and second strainers, and/or the discharging of the water containing biocide through the first and second ports, the first and second pumps being controllable in a cooperative fashion including a first mode in which the first pump is active and the second pump is idle and the first pump acts to draw water from the water source into the water system through the first port, and a second mode in which the second pump is active and the first pump is idle and the second pump acts to draw water from the water source into the water system through the second port.

In accordance with further aspects of the present disclosure, a method of bio-inhibiting an onboard water system of a watercraft is provided, the water system being configured to draw water from a water source on which the watercraft is supported through a first port positioned in a body or hull of the watercraft, the method comprising pumping untreated water from the water source through the first port such that the untreated water is pumped through a strainer of the onboard water system and to an electrode arrangement adapted to be incorporated as part of an electrolytic cell, the electrolytic cell generating biocide in the untreated water such that the untreated water becomes treated water; and feeding at least a first portion of the treated water to the strainer via a recirculation conduit. In some examples, the method further comprises feeding at least a second portion of the treated water to a water-reliant component of the onboard water system. In some examples, the method further comprises discharging at least a third portion of the treated water through the first port.

In accordance with still further aspects of the present disclosure, a method of bio-inhibiting an onboard water system of a watercraft is provided, the water system being configured to draw water from a water source on which the watercraft is supported through each of a first port and a second port positioned in a body or hull of the watercraft, the method comprising alternating between i) pumping first untreated water from the water source through the first port such that the first untreated water is pumped through a first strainer of the onboard water system and to an electrode arrangement adapted to be incorporated as part of an electrolytic cell, the electrolytic cell generating biocide in the first untreated water such that the first untreated water becomes first treated water; and feeding at least a first portion of the first treated water to a second strainer of the onboard water system via a first recirculation conduit; and ii) pumping second untreated water from the water source through the second port such that the second untreated water is pumped through the second strainer of the onboard water system and to the electrode arrangement, the electrolytic cell generating biocide in the second untreated water such that the second untreated water becomes second treated water; and feeding at least a first portion of the second treated water to the first strainer of the onboard water system via a second recirculation conduit. In some examples, the method further comprises feeding at least a second portion of the first treated water and/or the second treated water to a water-reliant component (e.g., a heat exchanger) of the onboard water system. In some examples, the method further comprises discharging at least a third portion of the first treated water through the second port and/or discharging at least a third portion of the second treated water through the first port.

In accordance with further aspects of the present disclosure, there is provided a biocide generating system for inhibiting bio-fouling of an onboard water system of a watercraft, the water system being configured to draw water from a water source on which the watercraft is supported through an inlet positioned in a body or hull of the watercraft, the biocide generating system comprising: an electrode arrangement adapted to be incorporated as part of an electrolytic cell through which water drawn from the water source flows; and a biocide distribution conduit terminating at an outlet positioned in the body or hull of the watercraft, the outlet being positioned relative to the inlet such that biocide discharged from the watercraft into the water source through the outlet is drawn through the inlet. In some examples, the water system includes a flow diverter that provides for controllable flow of the drawn water to one or both of a water-reliant component of the onboard water system and the electrode arrangement. In some examples, the inlet and the outlet are defined by a single through-hull fitting. In some examples, the inlet and the outlet are defined by separate through-hull fittings.

In accordance with further aspects of the present disclosure, there is provided a biocide generating system for inhibiting bio-fouling of an onboard water system of a watercraft, the water system being configured to draw water from a water source on which the watercraft is supported through an inlet positioned in a body or hull of the watercraft, the biocide generating system comprising a conduit arrangement that defines a first flow path extending from the inlet to an electrode arrangement and from the electrode arrangement to an outlet, and a second flow path extending from the inlet to a water-reliant component of the onboard water system, wherein the outlet is positioned relative to the inlet such that biocide ejected from the watercraft into the water source through the outlet is drawn through the inlet. In some examples, the second flow path bypasses the electrode arrangement. In some examples, the second flow path does not bypass the electrode arrangement.

In accordance with further aspects of the present disclosure, a method of bio-inhibiting an onboard water system of a watercraft is provided, the water system being configured to draw water from a water source on which the watercraft is supported through an inlet positioned in a body or hull of the watercraft, the method comprising pumping water from the water source through the inlet such that the water is pumped to an electrode arrangement adapted to be incorporated as part of an electrolytic cell, the electrolytic cell generating biocide in the water such that the water becomes treated water; and feeding at least a first portion of the treated water to an outlet positioned in the body or hull of the watercraft such that the at least a first portion of the treated water flows out of the outlet into the water source; and pumping at least a second portion of the at least a first portion of the treated water into the onboard water system through the inlet. In some examples, the method further comprises feeding at least a third portion of the treated water to a water-reliant component of the onboard water system.

In accordance with further aspects of the present disclosure, there is provided a biocide generating system for inhibiting bio-fouling within a water system of a watercraft, the water system being configured to draw water from a water source on which the watercraft is supported through at least a first port positioned in a body or hull of the watercraft, the biocide generating system defining an upstream to downstream direction corresponding to a direction of flow when water is being drawn through the first port into the water system, the biocide generating system comprising: an electrode arrangement adapted to be incorporated as part of an electrolytic cell through which water drawn from the water source flows; a flow meter positioned downstream of the electrode arrangement to detect metered flow out of the electrolytic cell; and a strainer positioned to collect debris travelling downstream in water treated by the electrolytic cell and stop the debris from contacting the flow meter.

In accordance with further aspects of the present disclosure, a method comprises: retro-fitting an onboard water system of a watercraft with a biocide generating system defining an upstream to downstream direction, the biocide generating system being configured to generate biocide in water flowing into the onboard water system from a water source on which the watercraft is supported through at least a first port positioned in a body or hull of the watercraft, the biocide generating system including: an electrode arrangement adapted to be incorporated as part of an electrolytic cell through which water drawn from the water source flows, the electrode arrangement being at least partially positioned within a chamber having a flow inlet and a flow outlet; a flow meter positioned downstream of the electrode arrangement to detect metered flow out of the electrolytic cell; and a strainer positioned at the outlet of the chamber and upstream of the flow meter. In some examples, the method further includes, subsequent to the retro-fitting, activating the electrolytic cell in a purge mode.

In accordance with further aspects of the present disclosure, there is provided a biocide generating system for inhibiting bio-fouling within a water system of a watercraft, the water system being configured to draw water from a water source on which the watercraft is supported through at least a first port positioned in a body or hull of the watercraft, the biocide generating system defining an upstream to downstream direction corresponding to a flow path when water is being drawn through the first port into the water system, the biocide generating system comprising: an electrode arrangement adapted to be incorporated as part of an electrolytic cell through which water drawn from the water source flows; a flow meter positioned to detect metered flow along the flow path; a first strainer positioned upstream of the electrode arrangement; and a second strainer positioned downstream of the first strainer and upstream of the flow meter to stop debris travelling downstream from the first strainer from contacting or passing the flow meter. In some examples, the second strainer is positioned at or adjacent an input of a canister housing the electrode arrangement. In some examples, the flow meter is positioned upstream of the electrolytic cell. In some examples, the flow meter is positioned downstream of the electrolytic cell.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows.

DETAILED DESCRIPTION

Like reference numbers refer to like parts in the several drawings.

Figure 1:
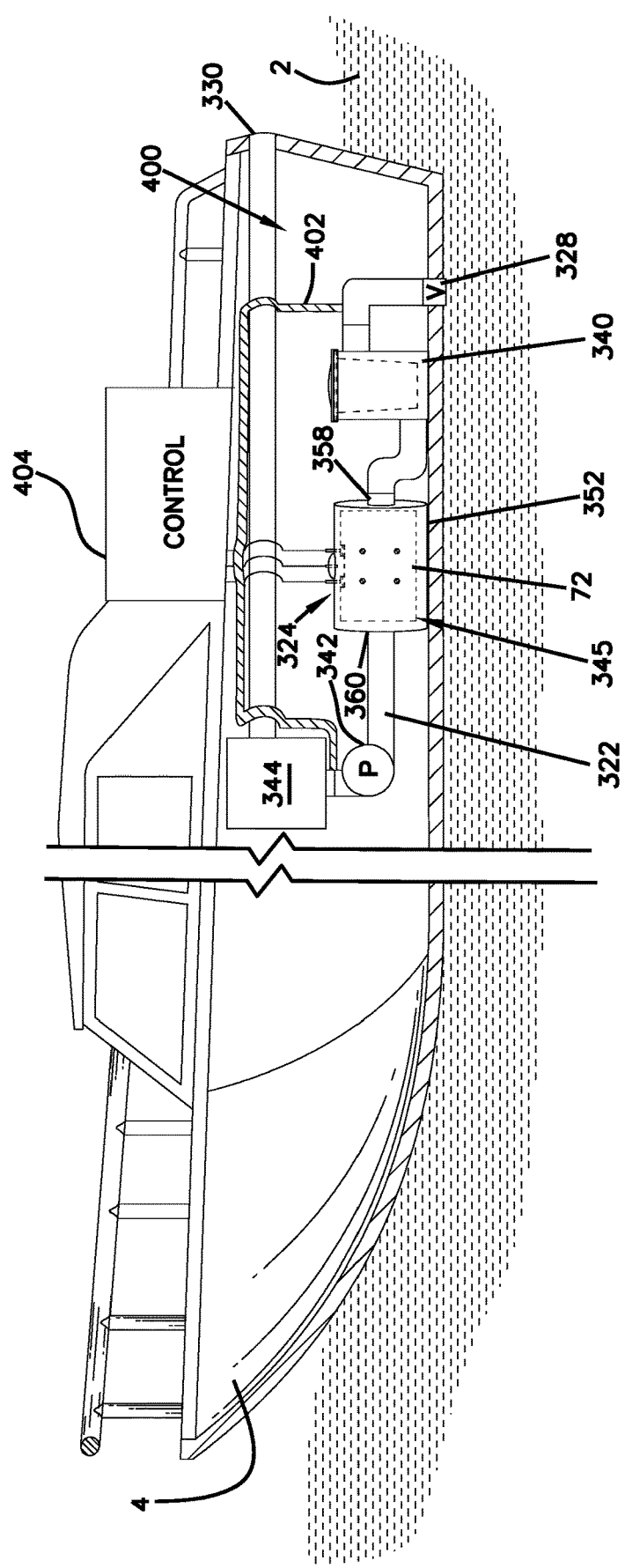
FIG. 1 schematically illustrates a watercraft including an embodiment of an onboard water system incorporating a biocide generating system in accordance with principles of the present disclosure, the watercraft being buoyantly supported by a body of water.

FIG. 1 depicts an on-board water system 400 of a watercraft 4 having a biocide generating system 324 in accordance with principles of the present disclosure. The watercraft is shown buoyantly supported by a body of water 2. The body of water also acts as a water source that sources the onboard water system 400 with water. The biocide generating system 324 includes an electrolytic cell 345 incorporated within a stand-alone housing 352 (e.g., an in-line housing). The configuration of the housing 352 is one example of many possible configurations. The stand-alone housing 352 has been integrated into an on-board water system at a location between a strainer 340 and a pump 342. The on-board water system 400 includes a through-hill fitting (THF) 328 defining an inlet, an outlet 330 defining a port, and water-reliant equipment 344 (e.g., a heat exchanger) downstream (i.e., on the high pressure side) of the pump 342. The THF 328 and/or the water outlet 330 can include a valve (e.g., a seacock) to control the opening and closing of the inlet and/or outlet.

The strainer 340 is a device that mechanically filters the water drawn into the water flow path to prevent undesirable material (e.g., particulates over a certain size) from passing through the water flow path. It will be appreciated that water strainers typically include removable filters that are periodically removed from the strainer, cleaned and then returned to the strainer. It will be appreciated that different filters can have different levels of filtration ranging from coarse to fine. Additionally, filters can have different configurations depending upon the type of strainer used. Some types of filters can include a basket type configuration. Other filters can be configured as cylindrical sleeves. Water drawn from the source 2 via the inlet of a through the THF 328 enters an interior of the straining filter through the opening in the housing of the strainer. In some examples the water is comingled with already strained and biocide treated water via the recirculation conduit 402. The water then passes through the filter media and exits the housing of the filter where it flows to the electrode arrangement 72. Particulate materials strained by the filter media remain on an inside of the filter media. When the straining filter is removed from the housing of the strainer 340, the strained material remains on the inside of the filter media and is preferably removed during cleaning.

Figure 2:
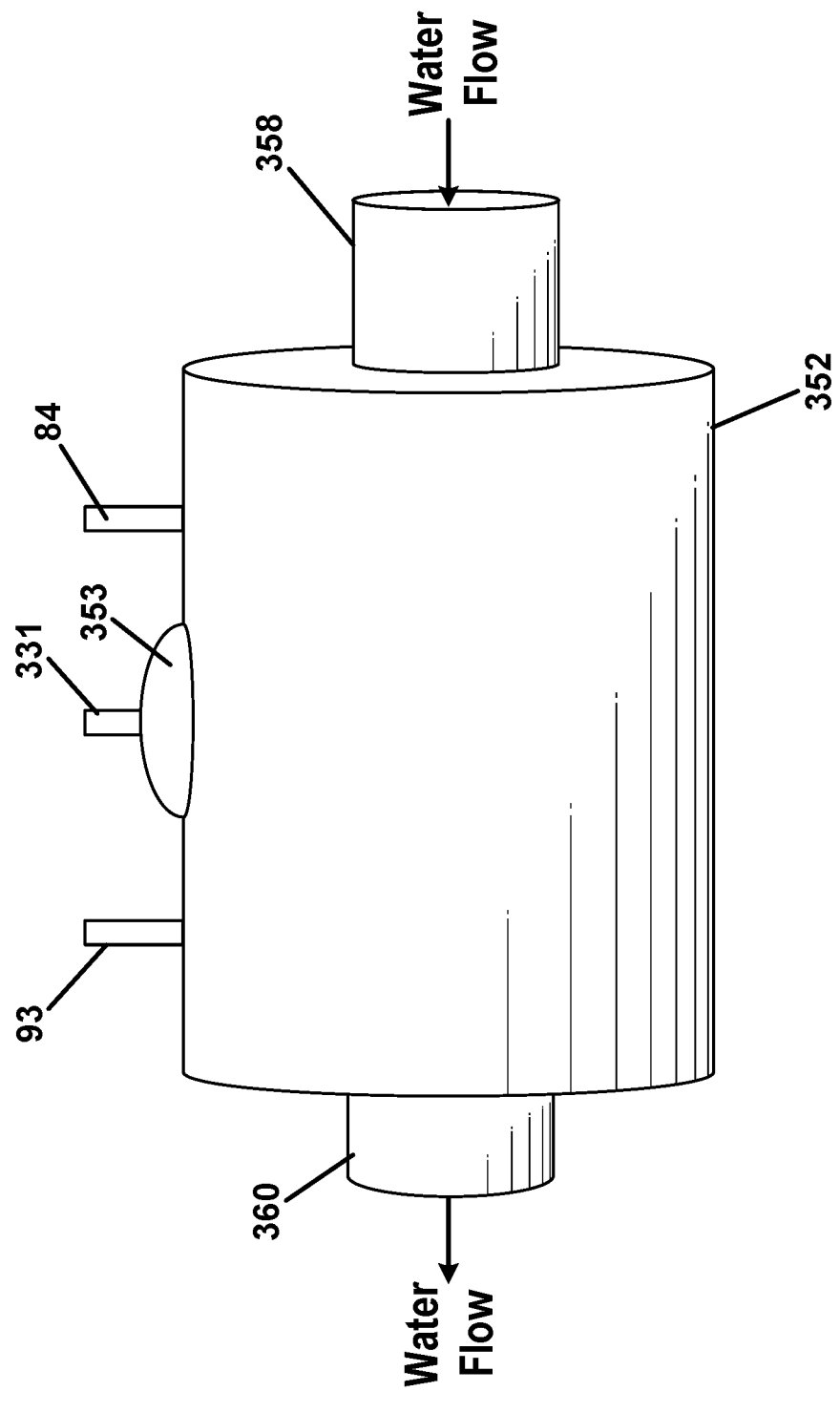
FIG. 2 depicts an example electrolytic cell of the biocide generating system of FIG. 1.
Figure 3:
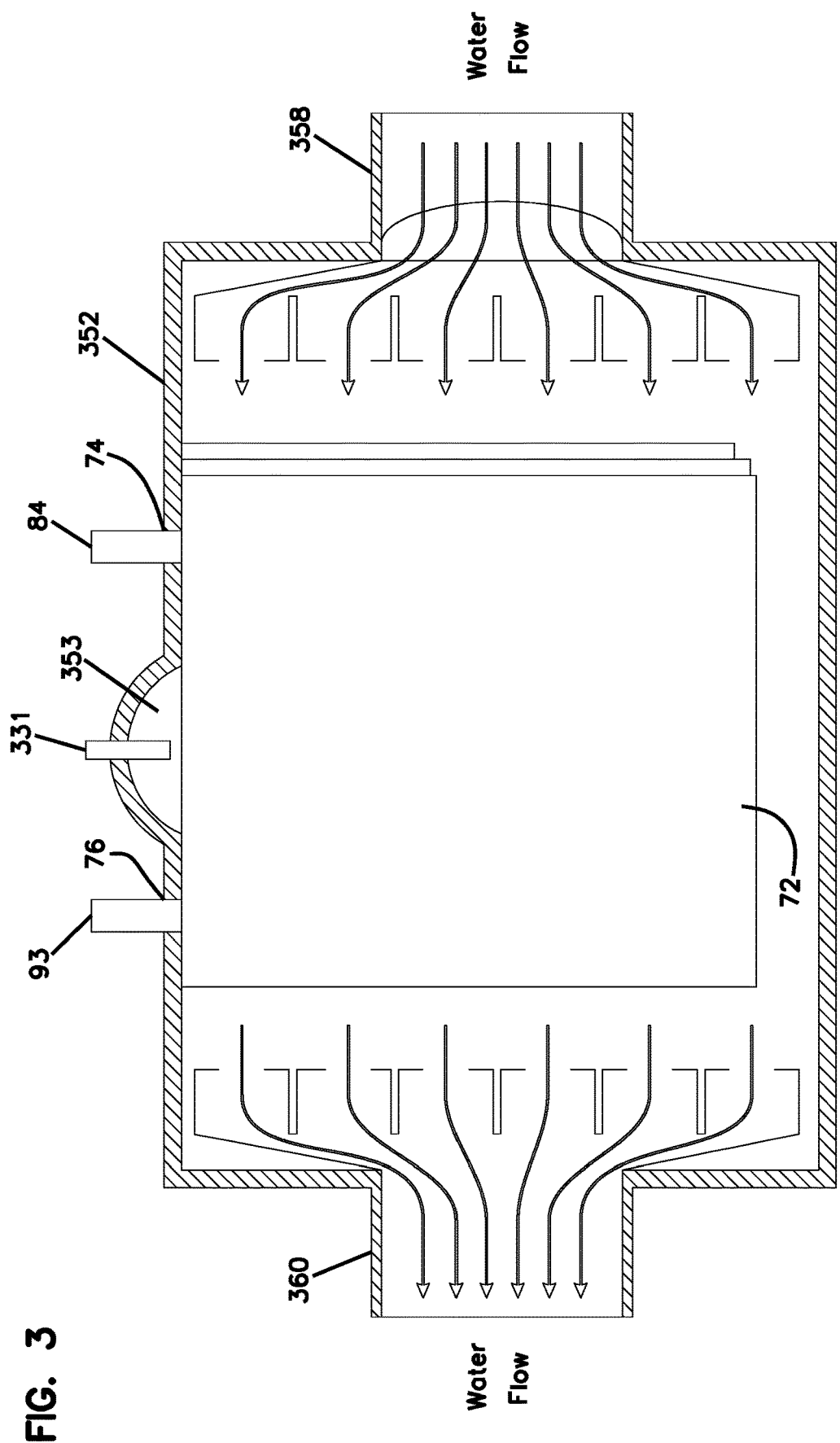
FIG. 3 is a cross-sectional view of the electrolytic cell of FIG. 2.

Referring to FIGS. 1-3, the electrode arrangement 72 is mounted within the stand-alone housing 352. The stand-alone housing 352 includes an upper gas collection location 353. A gas sensing electrode 331 is positioned at the gas collection location 353. The gas sensing electrode 331 projects through the housing 352 and can be coupled to a control system of the biocide generating system 324 by a lead. The terminal posts 84, 93 of electrodes 74,76 also project through the housing 352 and are connected to a power source of the control system by leads. In certain examples, the power source is an electrical current source configured to apply a current across the electrodes 74, 76 to drive electrolysis for generating biocide within the stand-alone housing 352. The current source can include an electronic circuit that delivers or absorbs an electric current independent of the voltage across it. The control 404 can interface with the pump 342 to determine whether the pump 342 is on or off. When the control 404 detects that the pump 342 is in an off state, the control 404 can terminate power to the electrolytic cell 345. The system 400 can include a flow sensor for sensing water flow through the housing 352, and can vary a magnitude of the electrical current based on detected water flow. The system 400 can include a temperature sensor for sensing a temperature of the control electronics of the system, and can stop the production of biocide if the temperature reaches a predetermined limit.

The biocide may also move by diffusion or pumping action in a direction extending from the electrolytic cell toward the inlet 328 of the water system via a recirculation conduit 402. In this way, water containing biocide can move into the strainer 340 to inhibit bio-growth in the strainer 340 or other components of the water system located upstream of the electrolytic cell, such as the THF 328.

In certain examples, one or more valves can be provided within the recirculation conduit 402 or other flow conduits of the onboard water system 400. The valves can be manually controlled, e.g., to change from a cleaning mode to a maintenance mode or vice versa. Likewise, the amount of power provided to the electrolytic cell can be adjusted via the control 404 depending on whether the water system is in a cleaning mode or maintenance mode.

In some examples, the valves can be linked to temperature, flow and/or pressure sensors and automatically adjusted via the control 404 to provide for flow of treated water (i.e., water treated with biocide by the electrode arrangement 72) to portions of the water treatment system that are both downstream and upstream of the electrode arrangement 72. In some examples, where treated water is directed and/or in what amounts depends on whether the water-reliant components 344 of the onboard water system presently require or do not require water. If water is not needed in the water-reliant component(s) 344, for example, one or more valves can shut off flow of biocide treated water to the water-reliant components while allowing gravity, residual pressure differential, or pump driven flow of treated water to other components of the onboard water systems such as the strainer 340, the THF 328, and/or any flow conduits that are upstream via the recirculation conduit 402. The system 400 may also be configured to operate in a mode wherein biocide treated water flows to the water-reliant component(s) 344 and to the upstream components of the water system at the same time. Conduit size and/or valves (optionally, controlled by the control 404 based on flow and/or pressure feedback) can be used to meter the flow of the biocide treated water such that the water demands of the water reliant-component(s) are met while still treating other components of the water system with biocide.

In certain examples, the water flow path may provide water to water system components for which biocide is not desired. Examples of such components can include potable water systems for providing drinking water (drinking water systems often include reverse osmosis filtration systems that are not compatible with significant levels of chlorine), shower water, water for faucets, or other potable water uses on the water vessel. A valve can be used to open and close fluid communication between the main water flow path and such a biocide incompatible component. When water system components that are incompatible with the presence of biocide in the water are in need of water from the water flow path, power to the electrolytic cell of the biocide generating system can be temporarily turned off so as to inhibit the generation of biocide. It will be appreciated that the control 404 can interface with such water systems and can automatically disable (i.e., turn off) the biocide generating system when water is needed for a potable water system, a bait well, or other water system where biocide is incompatible or otherwise not desired.

In the example of FIG. 1, the watercraft 4 is shown with only one on-board water system 400 having one water-reliant component 344. In other examples, watercraft may include multiple on-board water systems each having one or more pumps that operate independently of one another. Each water system can include one or more water-reliant components 344. It will be appreciated that separate biocide generating systems can be incorporated into each of the on-board water systems of the watercraft and can be controlled by a common control unit.

It will be appreciated that biocide generating systems in accordance with the principles of the present disclosure can be used for watercraft launched in both saltwater and freshwater. However, a preferred biocide in accordance with the aspects of the present disclosure includes chlorine generated through the electrolysis of seawater. Therefore, for freshwater watercraft, biocide generating systems in accordance with principles of the present disclosure can include a salt supplementing station where salt such as sodium chloride is added to the water of the on-board water system before the electrolytic cell of the biocide generating system. For marine watercraft, the natural salt present in sea water or brackish water is sufficient to allow for the in situ generation of biocide within the water flowing through the water flow path. For freshwater applications, it is contemplated that other biocides such as copper could also be used. In such systems, an electrolytic cell including electrodes of copper can be used to introduce copper as a biocide into the water of the water flow path.

As indicated above, a preferred biocide generated by biocide generating systems in accordance with principles of the present disclosure includes chlorine and/or a derivative thereof. Other biocides can also be generated dependent upon the type of salts present in the water. The process for generating biocide can include an in situ process where sea water (e.g., ocean water, brackish water, etc.) is subjected to electrolysis as the sea water flows through an electrolytic cell. The electrolytic cell can include electrodes defining an anode (e.g., a positive pole) and a cathode (e.g., a negative pole). The direct passage of electrical current through the sea water between the anode and the cathode drives electrolysis that separates the water and the salt into their basic elements. In certain examples, chlorine is generated at the anode and hydrogen is generated at the cathode. The chlorine generated at the anode and/or derivatives thereof can function as a biocide for inhibiting bio growth in conduits and equipment of the water flow path located after from the electrolytic cell. In certain examples, the controller can periodically reverse the polarity of the electrodes to minimize scaling.

In certain examples of the present disclosure, electrolytic cells in accordance with the principles of the present disclosure can include electrode arrangements each including first and second electrodes. The first electrode can include a plurality of first electrode plates and the second electrode can include a plurality of second electrode plates. The first and second electrode plates can be interleaved with respect to one another such that interstitial spaces are positioned between each of the first and second electrode plates. The saltwater flowing through the water flow path flows within the interstitial spaces and is electrolyzed as the water flows through the interstitial spaces such that chlorine is generated. In certain examples, each of the electrode plates includes an electrically conductive material such as a metal material. In one example, the metal material may include titanium. In certain examples, the electrode plates can be coated with a catalyst coating adapted to catalyze the generation of chlorine. In one example, the catalyst coating can include a platinum group metal. Example platinum group metals suitable for use in a catalyst coating include iridium and ruthenium. In certain examples, the catalyst coating may include metal oxide mixtures that can include oxides of iridium, and/or oxides of ruthenium and/or oxides of titanium and/or oxides of tantalum and/or oxides of niobium. It will be appreciated that the above catalysts are merely examples and that other catalyst mixtures can also be used. In certain examples, the catalyst coating including metal oxide mixtures may not be applied to the outside major surfaces of the outermost electrode plates in the electrolyte cell. Eliminating the coating on the outside major surfaces can help to reduce and/or eliminate scale build-up.

It will be appreciated that the rate at which biocide is generated is directly dependent upon the magnitude of the electrical current directed across the electrodes. Also, the amount of biocide generated is dependent upon the amount of time the cell is generating biocide. Further, the concentration of biocide generated in the electrolyte (e.g., sea water or other salt water) flowing through the system is dependent upon water flow rate. Thus, the concentration of biocide present in the flowing electrolyte of the system can be controlled by varying the current level across the electrodes and/or cycling the cell On and Off to vary the time of operation of the cell and/or varying the water flow rate through the system. In certain examples, the water flow rate through the system is monitored, and the electrical current level and/or the time of operation of the cell are varied (e.g., controlled, regulated, etc.) to achieve a target biocide concentration in the water of the system, which can in turn depend on the operating mode (e.g., cleaning versus maintenance) of the system. It will be appreciated that the water flow rate can be determined based on flow information derived from the pump control or by one or more flow sensors.

In certain examples, the control 404 can regulate the amount of chlorine generated based at least partially on a measured flow rate of the water flowing through the electrolytic cell for electrolysis.

In certain examples, pulsing the current to the electrodes On and Off results in slugs of chlorine treated water passing through the system, rather than a continuous flow of water having a constant chlorine concentration. In other examples, the total output of chlorine is controlled independent of the water flow rate through the electrolyte unit.

In certain examples, chlorine sensors for sensing chlorine concentration in the water can be provided at one or more locations along the flow path of the water system. For example, the sensors can be positioned at the electrolytic cell unit, at the seawater outlet, or at other positions along the flow path of the water system. The controller can interface with the sensors and can use chlorine concentration data from the sensors to control or vary operation of the electrolytic cell. For example, based on the sensed chlorine concentration or concentrations, the controller can increase or decrease water flow rate through the electrolytic cell unit and/or the electrical current provided to the electrolytic cell unit and/or an On and Off pulse duration of the cell unit. In this way, the controller can modify the rate of biocide generation and/or the water flow rate of the system in real time to maintain a desired chlorine concentration throughout the system or at discrete locations in the system. Moreover, the controller can control operation of the system so that the residual chlorine in the water discharged from the outlet 330 does not exceed a predetermined concentration level.

As mentioned, for different applications, biocide concentrations higher or lower than the above specified concentrations may be generated. For example, under certain circumstances, it may be desired to "shock" the water flow path (e.g., for purging purposes). For such applications, the biocide generating system can generate significantly higher concentrations of biocide as needed.

In a preferred example, the biocide generating system includes an adaptive dynamic control system that dynamically varies the magnitude of the current applied across the electrodes in direct proportion to the flow rate of water through the electrolytic cell. Thus, the rate of biocide production varies directly with the water flow rate through the system. The magnitude of electrical current used to provide a desired biocide concentration in the flow of sea water through the electrolytic cell for a given water flow rate can be determined by a method such as an algorithm or look-up table. The flow rate can be determined by a flow sensor. By dynamically controlling the rate of biocide generation, it is possible to maintain the concentration of biocide at a target level or within a target range regardless of the water flow rate.

The biocide generating system preferably operates to generate biocide while water is flowing through the water system. In this way, biocide generated at the electrolytic cell can be carried with the flowing water to treat the conduit and components of the water system located after the electrolytic cell. As indicated above, biocide can be generated continuously or intermittently as the water flows through the system. In certain examples, the biocide generating system may also operate to generate biocide for a controlled or limited duration when water is not flowing through the water system (e.g., when the pump is off). Preferably, the duration is short enough to prevent the excessive accumulation of gas within the system. In certain examples, the biocide generating system may operate intermittently to generate biocide while water is not flowing through the system so as to generate enough biocide to treat the portion of the water system upstream of the electrolytic cell without collecting excessive gas within the system (e.g., within the strainer). Preferably, for a majority of the time that water is not flowing through the water system, the biocide generating system will not be generating biocide.

Referring now to FIGS. 4-10, various embodiments of onboard water systems and their corresponding flow regimes, including both flows of biocide treated water and non-biocide treated water, will be described. Across all of these embodiments, one or more system inlets are shown. Each system inlet is adapted to be in selective open communication with a water source upon which the watercraft is buoyantly supported such that water from the water source can be drawn into the water system. Each system inlet is positioned in the body of the watercraft. For example, each system inlet can include a through-hull fitting (THF) that allows for selective opening and closing of a port defined by the inlet. Thus, each THF can include a valve, for example, such as a sea cock. The valve can be manually or automatically controlled, e.g., via the control 404, depending on the particular operating mode of the onboard water system at a particular point in time. The various flow regimes of FIGS.

4-10 also depict one or more valves that can help control flow of water to the various components of the onboard water system. Likewise, the valves can help control the level of biocide concentration that is directed to each component of the water system that requires intermittent or continuous biocide treatment. The valves can include, e.g., one way valves, check valves, etc. The valves can be manually operated or automatically controlled by the control 404 depending, e.g., on the operating mode of the onboard water system. In some examples, one or more of the valves can be used to provide metered flow of biocide treated water as needed. The control 404 is also operatively linked to the electrolytic cell and the pump(s). In this manner the control 404 can control when biocide is generated and in what amounts (e.g., by turning on and off and regulating the magnitude of current between the electrode arrangement) and, through control of the pump(s), when water is to be drawn from the water source, and/or driven in an internal flow pattern, and/or discharged to the water source. It should be appreciated that each of the water systems depicted in FIGS. 4-10 can serve a plurality of water-reliant components 344, including water-reliant components that are not compatible with biocide treated water. Each individual flow regime and control system can be tailored to the specific needs of the individual water-reliant components of a given system using, e.g., controllable valves and operating the biocide generator only intermittently. Each of the flow regimes of FIGS. 4-10 provides the ability to treat components of the water system that are upstream of the biocide generator with biocide. In this manner, organic buildup is reduced at, e.g., the strainer(s), the THF(s), any flow conduits therebetween, etc.

Figure 4:
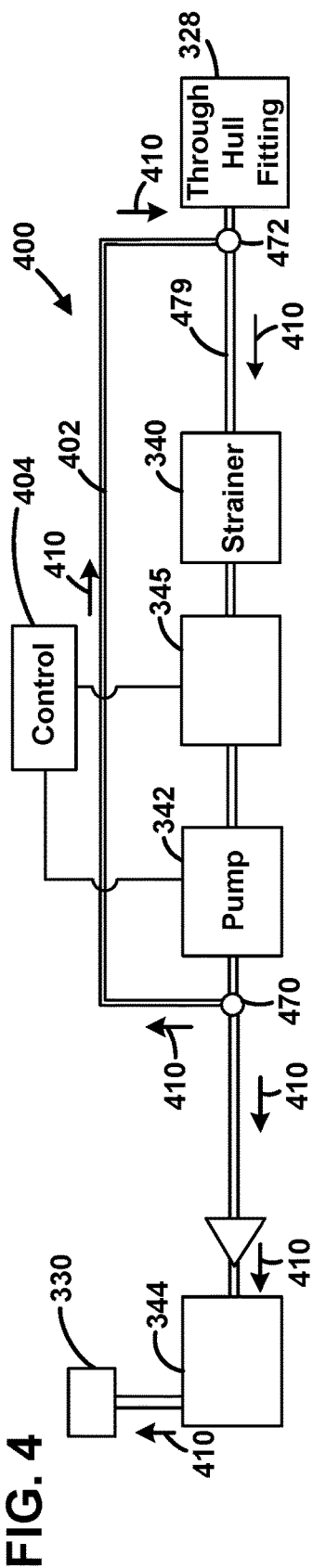
FIG. 4 is a schematic depiction of a portion of the onboard water system of FIG. 1.

Referring now to FIG. 4, the flow regime of the onboard water system 400 previously described is schematically depicted. A pump 342 is operable in a single pumping direction in which water is pumped from the water source via the THF 328. This untreated water flows (along the flow direction 410) to the strainer 340 which filters the untreated water. The filtered untreated water is then selectively treated with biocide by the electrolytic cell 345 (assuming biocide is being generated). On the high pressure side of the pump 342, the biocide treated water is furcated (optionally via a control valve) at a furcation fitting 470 (e.g., a bifurcation fitting) to one or more water-reliant components 344 of the water system 400 (and then discharged via the outlet 330), and also to the recirculation conduit 402. The recirculation conduit 402 directs the treated water to a junction 472 that is upstream of the strainer 340. At the junction 472, the treated water comingles with untreated water being drawn through the THF 328, such that the flow conduit segment 474 and the strainer 340 are treated with biocide to reduce biofouling in those components. It should be appreciated that the junction 472 can be positioned such that, upon shutting off of the pump 342, residual treated water in the recirculation conduit 402 can be discharged through the THF 328 on the action of gravity and/or a residual pressure differential in the flow regime.

Figure 5:
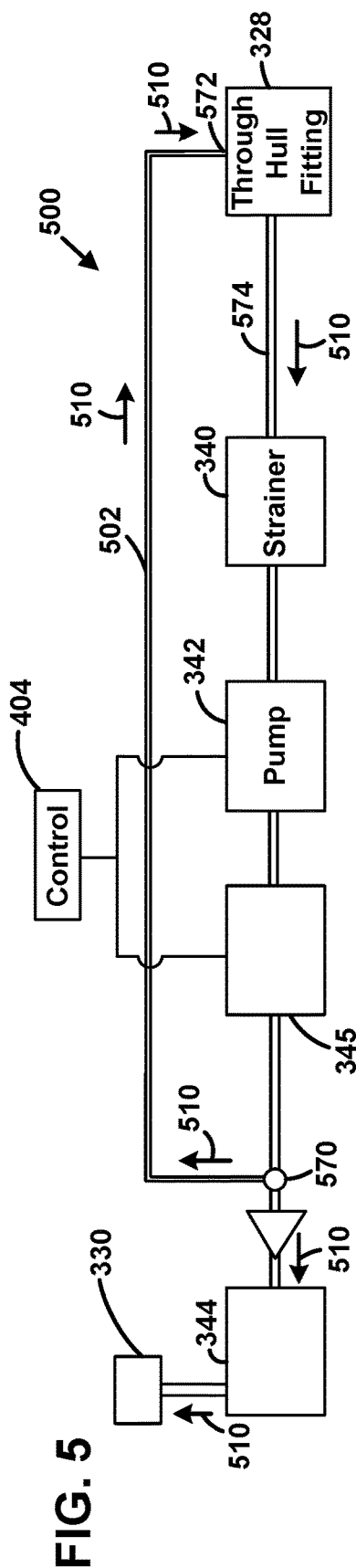
FIG. 5 is a schematic depiction of a portion of a further embodiment of an onboard water system in accordance with the present disclosure.

Referring now to FIG. 5, the pump 342 of the onboard water system 500 is positioned upstream of the electrolytic cell 345 (in the system 400 of FIG. 4 the pump 342 is positioned downstream of the electrolytic cell). The pump 342 is operable in a single pumping direction in which water is pumped from the water source via the THF 328. This untreated water flows (along the flow direction 510) to the strainer 340 which filters the untreated water. The filtered untreated water then passes through the pump 342 and is then selectively treated with biocide by the electrolytic cell 345 (assuming biocide is being generated). On the downstream side of the electrolytic cell 345 the biocide treated water is furcated (optionally via a control valve) at a furcation fitting 570 (e.g., a bifurcation fitting) to one or more water-reliant components 344 of the water system 500 (and then discharged via the outlet 330), and also to the recirculation conduit 502. The recirculation conduit 502 directs the treated water to a junction 572 with the THF 328 (that is upstream of the strainer 340 and the pump 342). At the junction 572, the treated water comingles with untreated water being drawn through the THF 328, such that the flow conduit segment 574, the strainer 340, and the pump 342 are treated with biocide to reduce biofouling in those components. The close proximity of the junction 572 to the THF 328 allows for some portion of the biocide treated water to pass through the THF 328 (and thereby treat the THF) and be discharged into the water source even when the pump 342 is operating.

Figure 6:
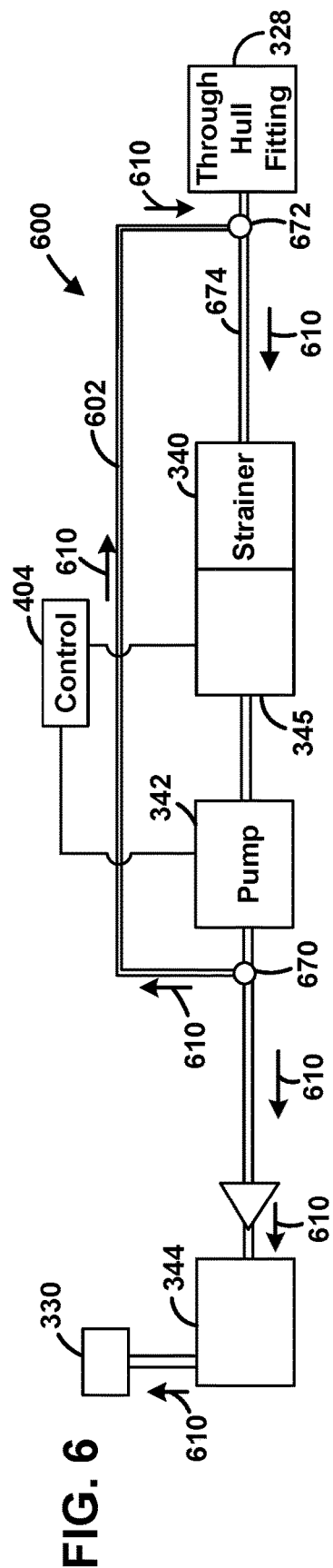
FIG. 6 is a schematic depiction of a portion of a further embodiment of an onboard water system in accordance with the present disclosure.

Referring now to FIG. 6, the flow regime of an onboard water system 600 is schematically depicted. A pump 342 is operable in a single pumping direction in which water is pumped from the water source via the THF 328. This untreated water flows (along the flow direction 610) to the strainer 340 which filters the untreated water. The filtered untreated water is then selectively treated with biocide by the electrolytic cell 345 (assuming biocide is being generated). On the high pressure side of the pump 342 the biocide treated water is furcated (optionally via a control valve) at a furcation fitting 670 (e.g., a bifurcation fitting) to one or more water-reliant components 344 of the water system 600 (and then discharged via the outlet 330), and also to the recirculation conduit 602. The recirculation conduit 602 directs the treated water to a junction 672 that is upstream of the strainer 340. At the junction 672, the treated water comingles with untreated water being drawn through the THF 328, such that the flow conduit segment 674 and the strainer 340 are treated with biocide to reduce biofouling in those components. It should be appreciated that the junction 672 can be positioned such that, upon shutting off of the pump 342, residual treated water in the recirculation conduit 602 can be discharged through the THF 328 on the action of gravity and/or a residual pressure differential in the flow regime. The system 600 is similar to the system 400 except that in the system 600 the strainer 340 and electrolytic cell 345 are a single integrated or unitary component, whereas in the system 400 the strainer 340 and the electrolytic cell 345 are standalone components.

Figure 7:
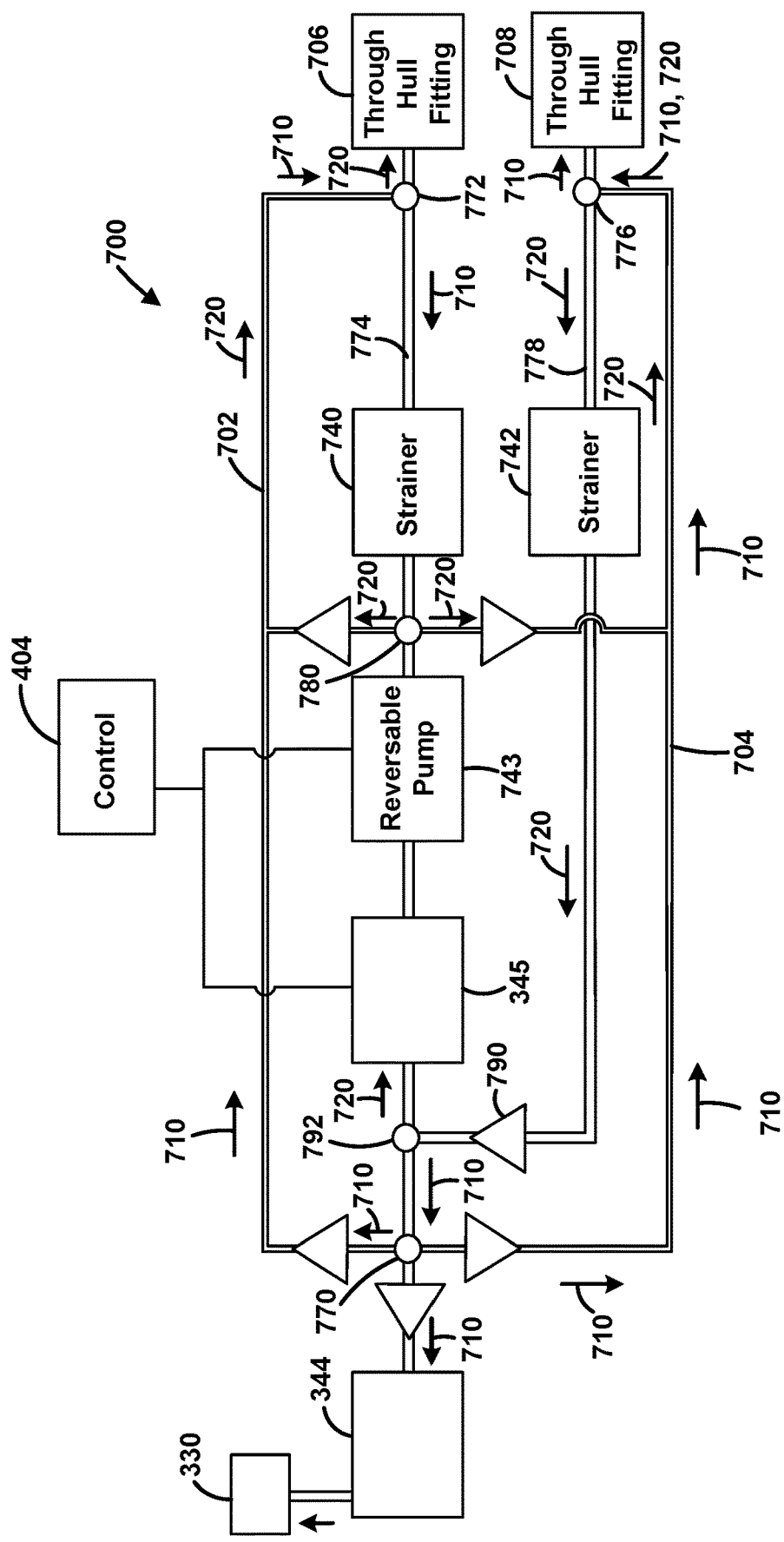
FIG. 7 is a schematic depiction of a portion of a further embodiment of an onboard water system in accordance with the present disclosure.

Referring now to FIG. 7, the flow regime of an onboard water system 700 is schematically depicted. The system 700 includes two independent inlets having THF's 706, 708 for selectively drawing water from a water source. A reversible pump 743 is selectively operable in a forward direction and a reverse direction. The control 404 can control the pump 743 and cause the pump 743 to alternate between forward and reverse directions while coordinating operation of the electrolytic cell 345 such that all components 344 that are compatible with the biocide generated by the electrolytic cell 345 are intermittently treated with biocide treated water. Within the overall flow regime, the pump 743 is positioned between the first strainer 740 and the electrolytic cell 345. In the forward direction, the pumping action of the pump 743 causes water to be drawn from the source through the THF 706 into the onboard water system and along a flow path 710. In the reverse direction, the pumping action causes water to be drawn from the source through the THF 708 into the onboard water system and along a flow path 720. A first strainer 740 is associated with the THF 706. A second strainer 742 is associated with the THF 708. When the pump 743 is operating in a forward direction, untreated water flows (along the flow direction 710) to the first strainer 740 which filters the untreated water. The filtered untreated water is then selectively treated with biocide by the electrolytic cell 345 (assuming biocide is being generated). On the high pressure side of the pump 743 the biocide treated water is furcated (optionally via a control valve) at a furcation fitting 770 (e.g., a bifurcation fitting) to one or more water-reliant components 344 of the water system 700 (and then discharged via the outlet 330), and also to two recirculation conduits 702 and 704. The recirculation conduit 702 directs the treated water to a junction 772 that is upstream of the strainer 740. At the junction 772, the treated water comingles with untreated water being drawn through the THF 706, such that the flow conduit segment 774, the strainer 740, and the pump 743 are treated with biocide to reduce biofouling in those components. It should be appreciated that the junction 772 can be positioned such that, upon shutting off of the pump 743, residual treated water in the recirculation conduit 702 can be discharged through the THF 706 on the action of gravity and/or a residual pressure differential in the flow regime. The recirculation conduit 704 directs the treated water to a junction 776. From the junction 776 the treated water is discharged through the THF 708 thereby treating the THF 708 with biocide. When the pump 743 is operating in a reverse direction, untreated water flows from the THF 708 (along the flow direction 720) to the second strainer 742 which filters the untreated water. The filtered untreated water then passes through a one-way valve 790 and a juncture 792 and is then selectively treated with biocide by the electrolytic cell 345 (assuming biocide is being generated). On the high pressure side of the pump 743 the biocide treated water is furcated (optionally via a control valve) at a furcation fitting 780 (e.g., a bifurcation fitting) to the two recirculation conduits 702 and 704 (optionally, and depending on the configuration of the strainer 740, at least a portion of the treated water can be directed in a reverse direction through the strainer 740 and then discharged through the THF 706). The recirculation conduit 702 directs the treated water to the junction 772 and is discharged through the THF 706, treating the THF 706 with biocide. The recirculation conduit 704 directs the treated water to the junction 776 where the treated water comingles with untreated water being drawn through the THF 708, such that the flow conduit segment 778 and the strainer 742 are treated to reduce biofouling in those components. It should be appreciated that the junction 776 can be positioned such that, upon shutting off or reversal of the pump 743, residual treated water in the recirculation conduit 704 can be discharged through the THF 708 on the action of gravity and/or a residual pressure differential in the flow regime.

Figure 8:
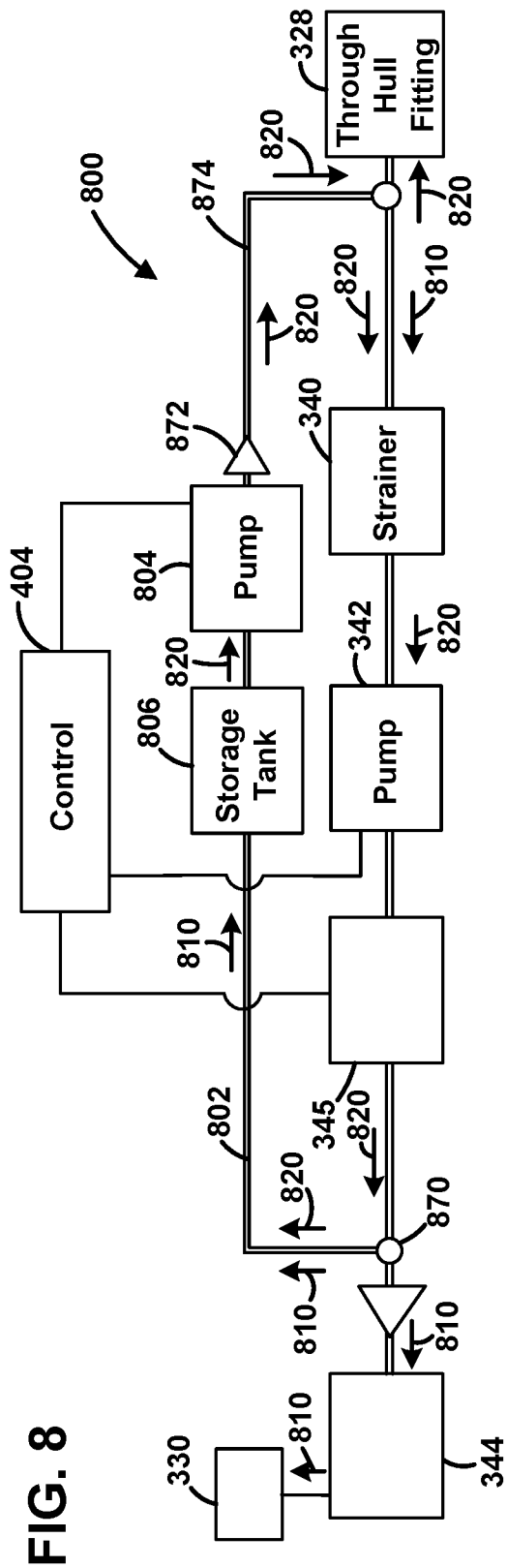
FIG. 8 is a schematic depiction of a portion of a further embodiment of an onboard water system in accordance with the present disclosure.

Referring now to FIG. 8, the pump 342 of the onboard water system 800 is positioned upstream of the electrolytic cell 345. The pump 342 is operable in a single pumping direction in which water is pumped from the water source via the THF 328. This untreated water flows (along the flow direction 810) to the strainer 340 which filters the untreated water. The filtered untreated water then passes through the pump 342 and is then selectively treated with biocide by the electrolytic cell 345 (assuming biocide is being generated). On the downstream side of the electrolytic cell 345 the biocide treated water is furcated (optionally via a control valve) at a furcation fitting 870 (e.g., a bifurcation fitting) to one or more water-reliant components 344 of the water system 500 (and then discharged via the outlet 330), and also to the recirculation conduit 802. The recirculation conduit 802 directs the treated water to a storage tank 806 where treated water is stored until the control 404 causes the stored treated water to be released. In some examples, the pump 342 runs until the storage tank 806 is full. At this point, either a valve closes off additional flow of treated water to the recirculation conduit 802, or the pump 342 is switched off. Once the pump 342 is switched off, the auxiliary pump 804 can be switched on. The auxiliary pump 804 draws treated water from the storage tank 806 and forces the treated water out of the THF 328 via a one way valve 872 and along a flow path 820, thereby treating the THF 328 with biocide and also the strainer 340. Once the pump 804 has been operating for a predetermined amount of time, it can be switched off and the pump 342 switched on, causing some residual treated water in the conduit 874 to comingle with untreated water being drawing through the THF 328 to flow to the strainer 340 and the pump 342 and thereby treat those components with biocide. Optionally, if water is not presently needed by the water-reliant component(s) 344, the pumps 342 and 804 can be operated simultaneously to generate biocide in a treatment circulation route (or circuit) for treating the strainer 340 and the pump 342.

Figure 9:
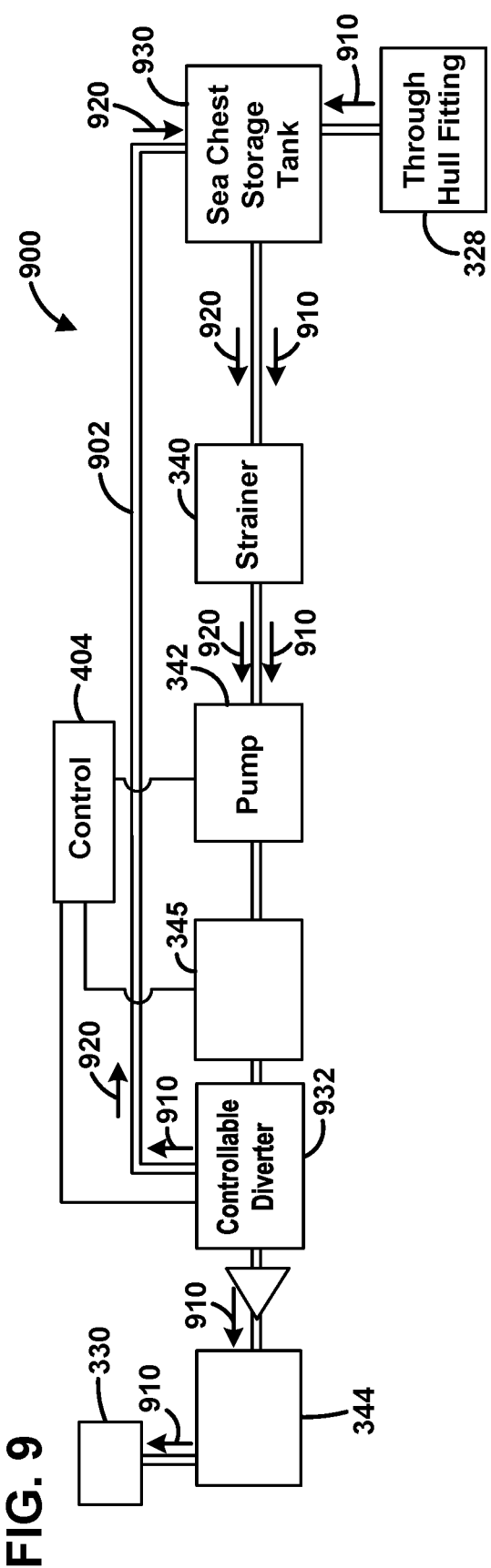
FIG. 9 is a schematic depiction of a portion of a further embodiment of an onboard water system in accordance with the present disclosure.

Referring now to FIG. 9, the pump 342 of the onboard water system 900 is positioned upstream of the electrolytic cell 345. The pump 342 is operable in a single pumping direction in which water is pumped from the water source via the THF 328 and a storage tank 930. The storage tank 930 serves as a reservoir of water for future use by the water reliant component(s) of the onboard water system, e.g., during periods of high demand. This untreated water flows (along the flow direction 910) to the strainer 340 which filters the untreated water. The filtered untreated water then passes through the pump 342 and is then selectively treated with biocide by the electrolytic cell 345 (assuming biocide is being generated). On the downstream side of the electrolytic cell 345 the biocide treated water flows to a controllable diverter 932 (controllable by the control 404) which, in a first operating mode, directs the treated water to one or more water-reliant components 344 of the water system 500 (and then discharged via the outlet 330). Through operation of the diverter 932, the system 900 can operate in multiple modes. In one mode, once the tank 930 is full or meets a predetermined threshold volume of water, the THF 328 can be closed such that no further water is drawn from the water source, and the diverter 932 can be controlled to divert all treated water to the recirculation conduit 902 and away from the water-reliant component(s) 344, thereby generating a closed circulation loop with the pump 342 along a flow path 920. The flow path 920 also causes treated water to flow to and treat the strainer 340 and the pump 342 with biocide. Water is drawn from the tank 930 until a predetermined concentration of biocide is achieved in the water in the closed loop by the electrolytic cell 345. Once the needed concentration is reached in the closed flow circuit and the strainer 340 and pump 342 are adequately treated with biocide, the pump 342 can be switched off, the THF 328 opened and the treated water can be discharged through the THF 328 (e.g., by gravity) to thereby treat the THF 328 with biocide. Thereafter the diverter 932 can revert to its non-diverting configuration and the pump switched on to feed water to the water-reliant components 344 as needed.

Figure 10:
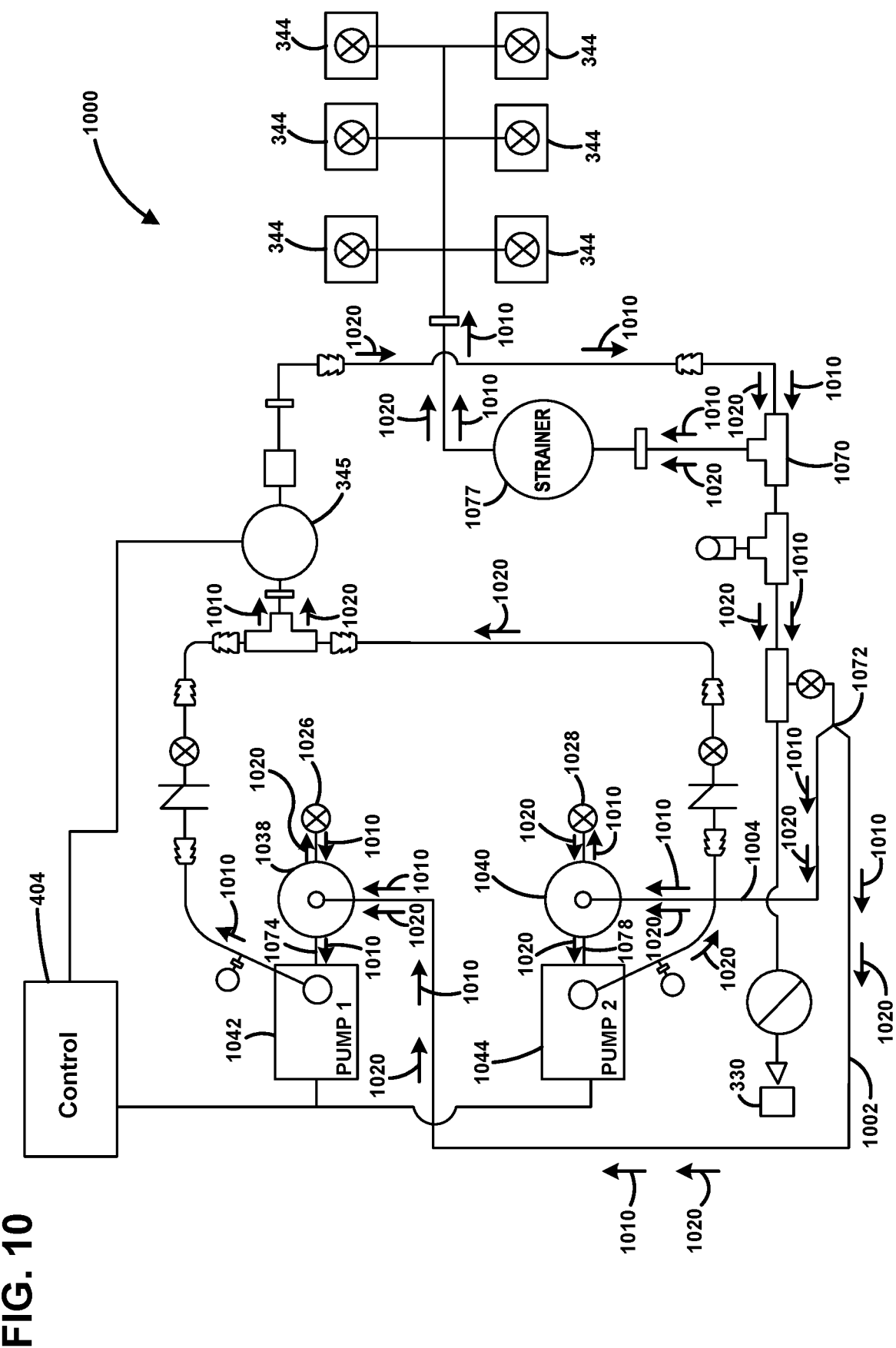
FIG. 10 is a schematic depiction of a portion of a further embodiment of an onboard water system in accordance with the present disclosure.

Referring now to FIG. 10, the flow regime of an onboard water system 1000 is schematically depicted. The system 1000 includes two independent inlets having THF's 1026, 1028 for selectively drawing water from a water source. Each THF 1026, 1028 has an associated strainer 1038, 1040, an associated single-directional pump 1042, 1044, and an associated recirculation conduit 1002, 1004, respectively. The system 1000, via the control 404 is configured, in some examples, to alternate operation of the pumps 1042 and 1044 such that only one or neither of the pumps is operating at one time, and both pumps are never operating at the same time. When the pump 1042 is pumping (and the pump 1044 is idle), the pumping action of the pump causes water to be drawn from the source through the THF 1026 into the onboard water system and along a flow path 1010. Untreated water flows (along the flow direction 1010) to the first strainer 1038 which filters the untreated water. The filtered untreated water is then selectively treated with biocide by the electrolytic cell 345 (assuming biocide is being generated). On the high pressure side of the pump 1042 the biocide treated water is furcated (optionally via a control valve) at a furcation fitting 1070 (e.g., a bifurcation fitting) to one or more water-reliant components 344 of the water system 1000, optionally via another strainer 1077, and also to two recirculation conduits 1002 and 1004 via junction 1072. The recirculation conduit 1002 directs the treated water directly to the strainer, or to a point near the strainer 1038 (e.g., a point upstream of the strainer 1038), where the treated water comingles with untreated water being drawn through the THF 1026, such that the flow conduit segment 1074, the strainer 1038, and the pump 1042 are treated with biocide to reduce biofouling in those components. The recirculation conduit 1004 directs the treated water such that it discharges through the THF 1028, thereby treating the THF 1028 with biocide. When the pump 1044 is pumping (and the pump 1042 is idle), the pumping action of the pump 1044 causes water to be drawn from the source through the THF 1028 into the onboard water system and along a flow path 1020. Untreated water flows (along the flow direction 1020) to the second strainer 1040 which filters the untreated water. The filtered untreated water is then selectively treated with biocide by the electrolytic cell 345 (assuming biocide is being generated). On the high pressure side of the pump 1044 the biocide treated water is furcated (optionally via a control valve) at a furcation fitting 1070 (e.g., a bifurcation fitting) to one or more water-reliant components 344 of the water system 1000, optionally via another strainer 1077, and also to two recirculation conduits 1002 and 1004 via junction 1072. The recirculation conduit 1004 directs the treated water directly to, or to a point that is near the strainer 1040 (e.g., a point upstream of the strainer 1040), where the treated water comingles with untreated water being drawn through the THF 1028, such that the flow conduit segment 1078, the strainer 1040, and the pump 1044 are treated with biocide to reduce biofouling in those components. The recirculation conduit 1002 directs the treated water such that it discharges through the THF 1026, thereby treating the THF 1026 with biocide. Thus, by alternating activation of the pumps 1042, 1044 with coordination of biocide generation by the electrolytic cell 345, biocide treatment of both THF's 1026, 1028, both strainers 1038, 1040, and both pumps 1042, 1044 can be achieved in alternating or intermitted fashion, thereby improving the performance and increasing the lifetime of the overall system 1000.

Figure 11:
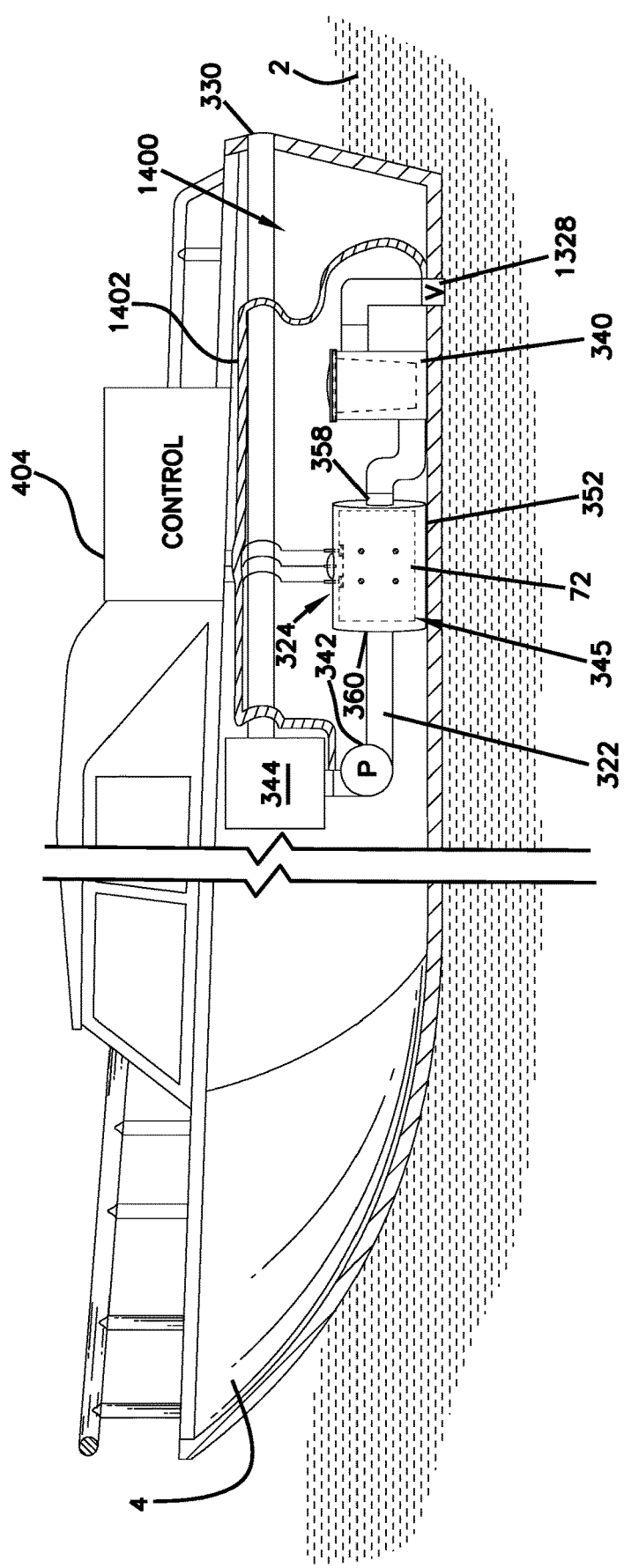
FIG. 11 schematically illustrates a watercraft including a further embodiment of an onboard water system incorporating a biocide generating system in accordance with principles of the present disclosure, the watercraft being buoyantly supported by a body of water.

Referring now to FIG. 11, there is depicted a further example on-board water system 1400 of a watercraft 4 having a biocide generating system 324 in accordance with the principles of the present disclosure. The watercraft is shown buoyantly supported by a body of water 2. The body of water 2 also acts as a water source that sources the onboard water system 1400 with water. The on-board water system 1400 includes a THF 1328, an outlet 330 defining a port, a pump 342, and water-reliant equipment 344 (e.g., a heat exchanger).

Two flow paths are defined on the high pressure side of the pump 342. A first of the flow paths directs flow of biocide treated water to the water-reliant equipment 344, which water is ultimately discharged through the outlet 330. A second of the flow paths is via a recirculation line or biocide distribution conduit 1402 that bypasses the water-reliant equipment 344. The recirculation line 1402 directs flow of biocide treated water to the THF 328. One or more controllable valves or other flow control features (e.g., a flow diverter, relative flow conduit sizes) can be used to control the amount of fluid flow as between the first and second flow paths.

Figure 12:
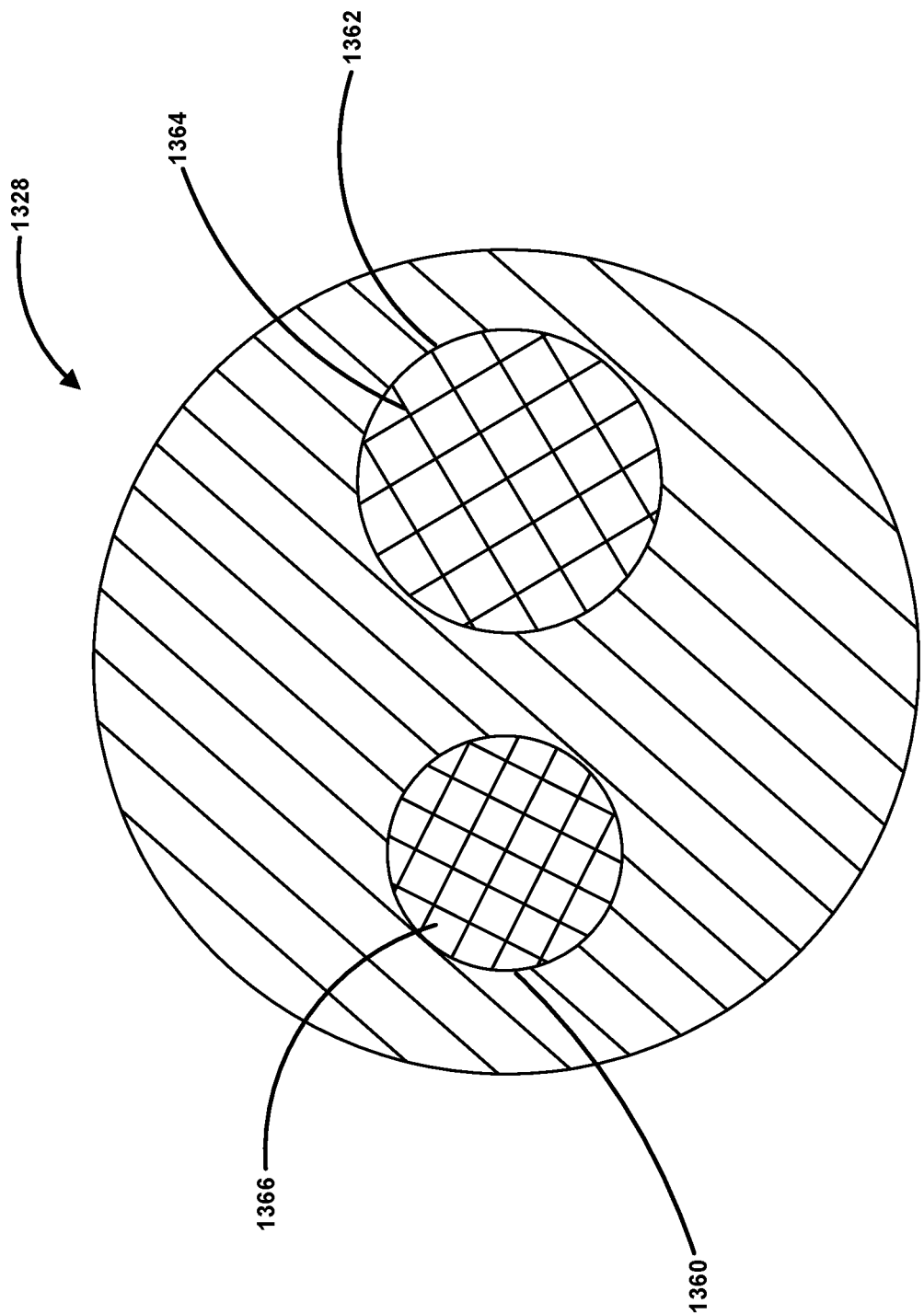
FIG. 12 is a schematic end view of an embodiment of a through-hull fitting in accordance with the present disclosure.

Referring now to FIG. 12, a schematic end view of the THF 1328 is depicted. The THF 1328 defines an inlet 1362 and an outlet 1360. In at least some examples, the inlet and/or the outlet are positioned to be below the water line of the water source when the watercraft is buoyantly supported by the water source. A grate 1364 is positioned externally to the outlet to prevent relatively large objects in the water source from entering the onboard water system through the inlet 1362. The exterior of such grates can be susceptible to biofouling, such as by attachment of barnacles and mussels, which can inhibit flow into the onboard water system and require costly biofouling removal procedures, such as manual removal of the organisms from the grate 1364 by a diver. The outlet 1360 can also be provided with an external grate 1366.

Figure 13:
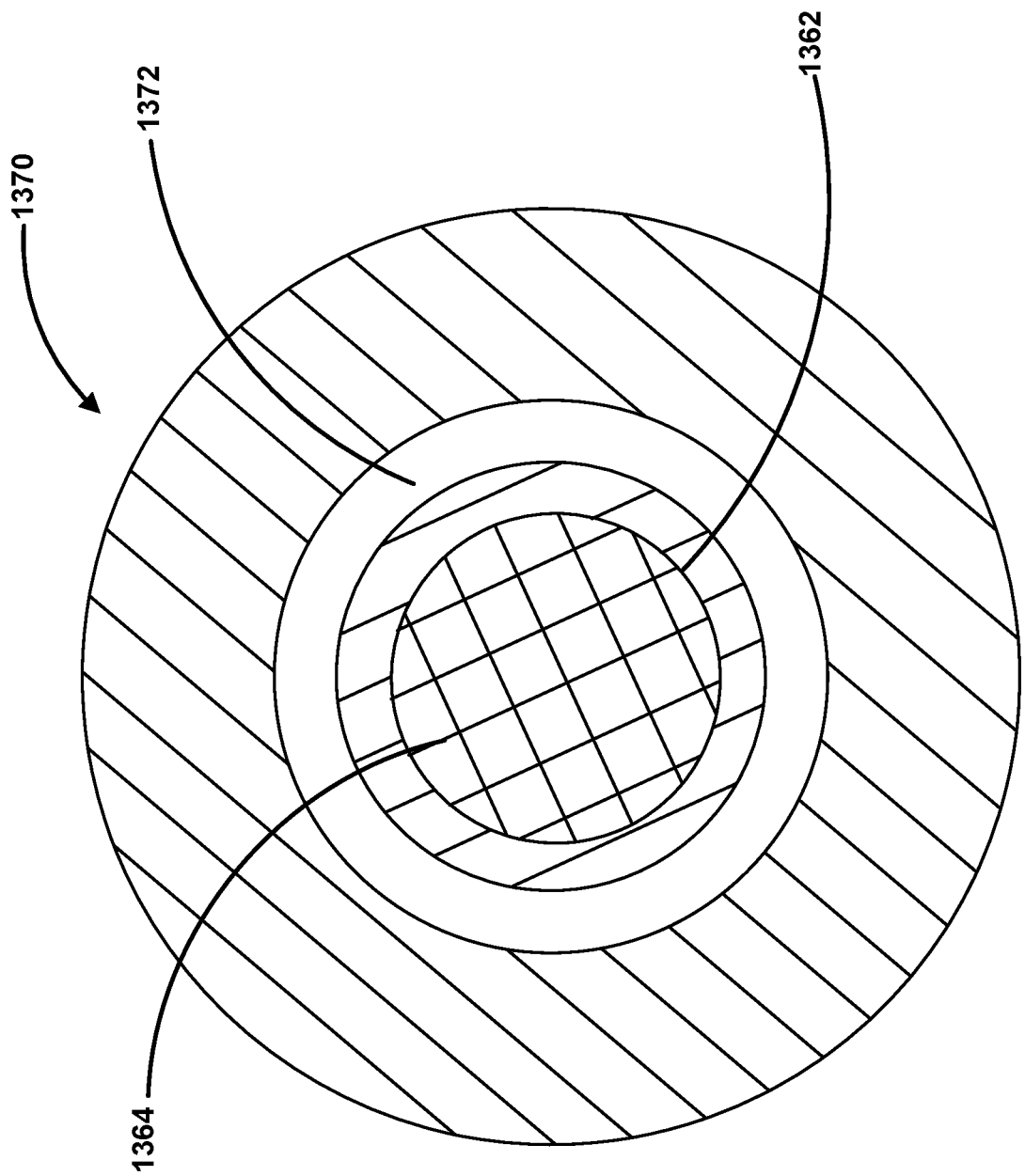
FIG. 13 is a schematic end view of a further embodiment of a through-hull fitting in accordance with the present disclosure.

Both the inlet and the outlet can be in fluid communication with the water source 2. Flow through the inlet and/or or the outlet can be controlled with valves. Action by the pump 342 draws water from the water source 2 through the inlet 1362, and discharges biocide treated water via the biocide distribution conduit 1402 into the water source 2 through the outlet 1360. The positioning of the outlet 1360 relative to the inlet 1362 can be such that water drawn through the inlet 1362 includes biocide discharged through the outlet 1360. For example, the outlet and inlet are positioned close together to maximize re-introduction of discharged biocide through the inlet 1362. In some examples, the outlet 1360 can be positioned on the bow side of the inlet 1362 since typical motion of the watercraft 4 will cause the discharged biocide to flow towards the stern (i.e., towards the inlet 1362). The outlet 1360 can also take on different forms, such as a plurality of outlets surrounding or partially surrounding the inlet 1362, or a tubular shaped-outlet that surrounds the inlet 1362. Such an arrangement is schematically depicted in FIG. 13, in which the THF 1370 includes an inlet 1362 surrounded by biocide discharge outlet 1372 that has a tubular configuration. Optionally, the outlet 1372 can also be provided with an external grate.

In still other examples, the outlet and the inlet are not integrated into the same through-hull fitting, but rather separate through hull fittings positioned near each other in the hull of the watercraft.

The electrode arrangement 72 and flow volumes and/or flow rates are controlled to generate sufficient biocide discharged via the outlet of the THF such that the concentration of biocide in the water being drawn into the onboard water system via the inlet 1362 of the THF is sufficient to inhibit or clean biofouling in the components of the onboard water system positioned between the inlet of the THF and the electrolytic cell, including the grate 1364 on the exterior of the inlet 1362 itself.

Figure 14:
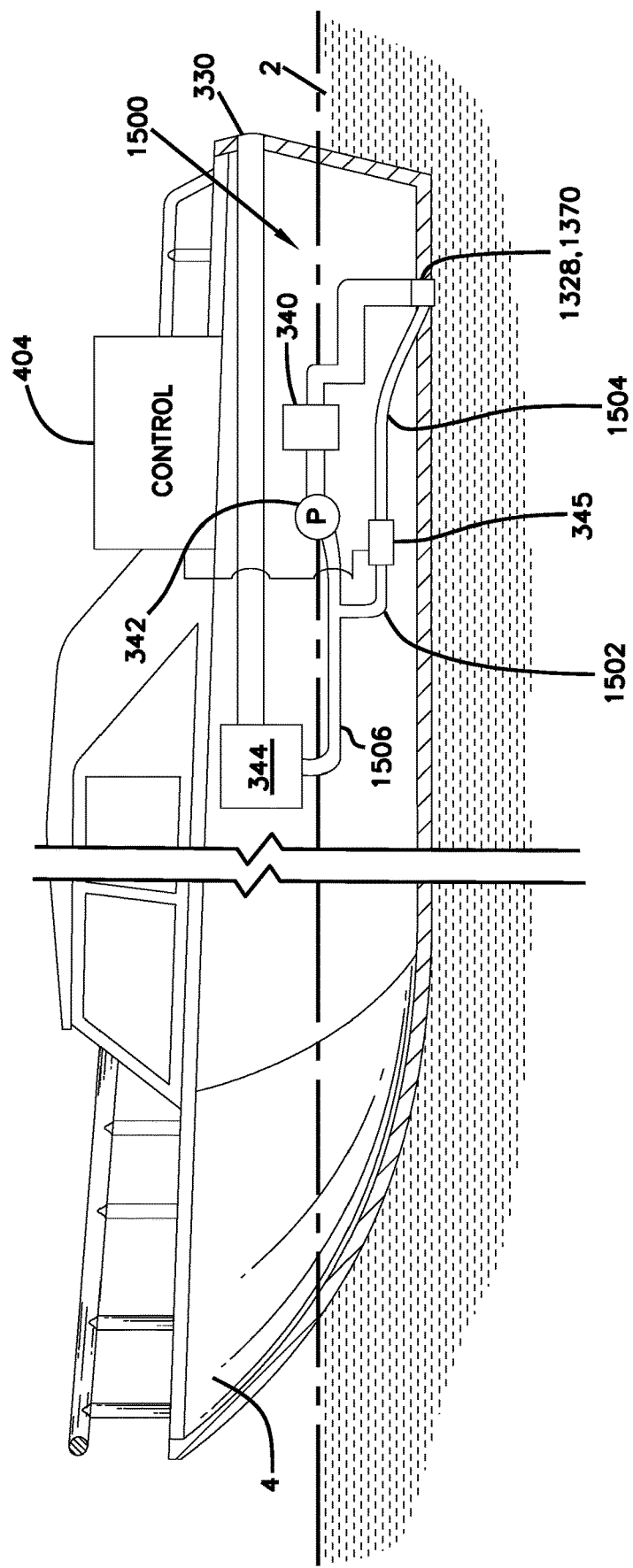
FIG. 14 schematically illustrates a watercraft including a further embodiment of an onboard water system incorporating a biocide generating system in accordance with principles of the present disclosure, the watercraft being buoyantly supported by a body of water.

Referring now to FIG. 14, a further embodiment of an onboard water system 1500 is depicted. Action by the pump 342 draws water from the source 2 through the inlet and exterior grate of the THF 1328, 1370. On the low pressure side of the pump 342 the drawn water flows through the strainer 340. On the high pressure side of the pump 342 two flow paths are defined. A first flow path directs fluid flow to the water-reliant component(s) 344 via conduit 1506, and ultimately out the outlet 330. A second flow path directs fluid flow via the conduit 1502 to a biocide generating electrolytic cell 345 (generated using an electrode arrangement), and from the electrolytic cell 345 to the outlet of the THF 1328, 1370 via the biocide distribution conduit 1504. Relative flow between the two flow paths can be controlled using a flow diverter or other flow controls. At the outlet of the THF 1328, 1370, the biocide treated water is discharged into the water source 2 and then at least partially reintroduced to the onboard water system 1500 through the inlet of the THF 1328, 1370, such that all components of the onboard water system, including the external grate of the THF 1328, 1370, other components of the THF, the strainer 340, the pump 342, and the water reliant component(s) are at least periodically treated with biocide generated by the electrolytic cell 345.

In some examples, a scoop is provided at the inlet, the scoop being configured to direct water from the water source into the onboard water system. In some examples, water from the water source flows from the scoop to an onboard water reservoir or storage tank of the onboard water system. In some examples, water from the water source flows from the scoop into the onboard water system and does not flow to an onboard water reservoir or storage tank. In some examples, one or more of the biocide generating systems of the present disclosure is configured to feed biocide treated water to the scoop to inhibit and/or clean biofouling of the scoop. In some examples, treated water discharged through the outlet is drawn into the scoop to inhibit and/or clean biofouling of the scoop. In some examples, the onboard water system does not include an onboard water reservoir or storage tank.

Figure 15:
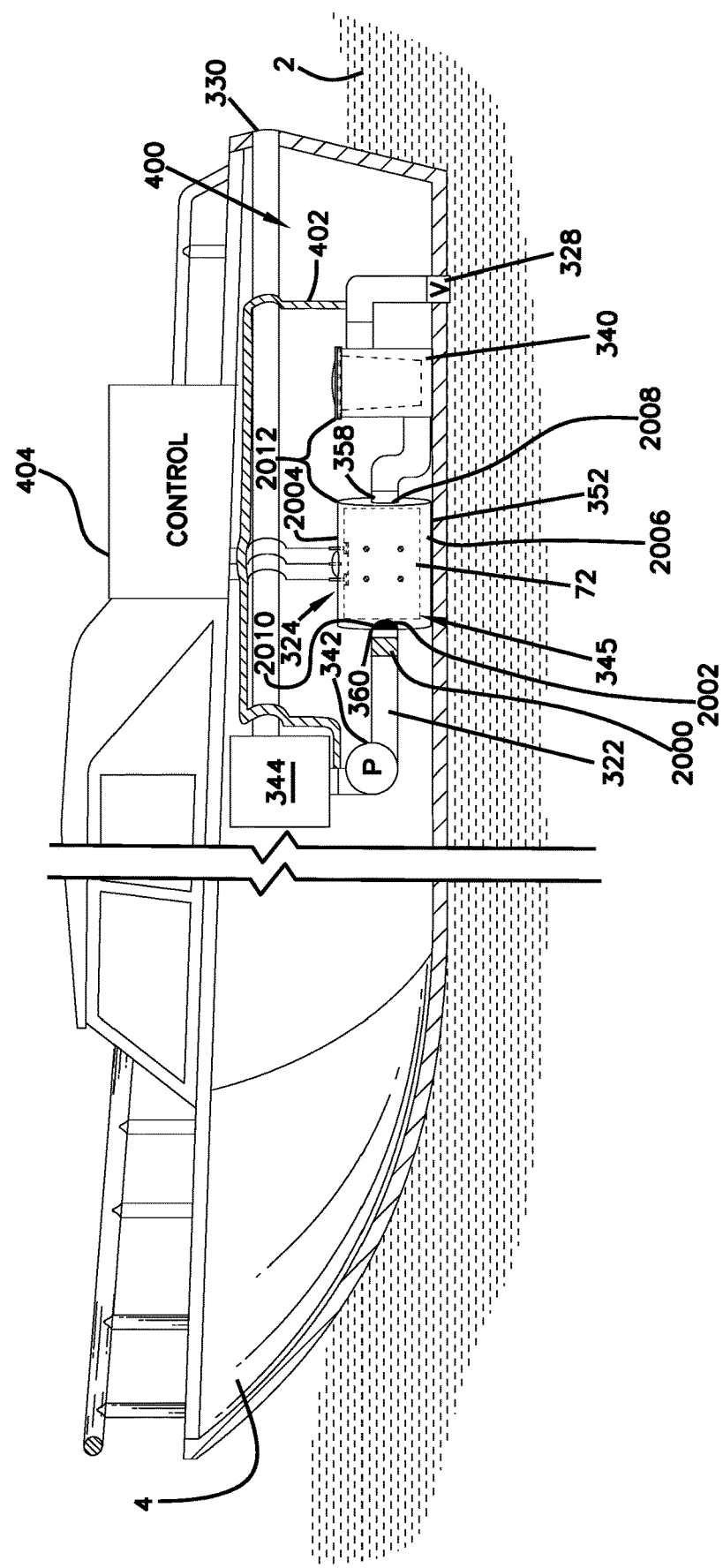
FIG. 15 schematically illustrates the watercraft and onboard water system of FIG. 1, and including a schematically illustrated flow meter and a schematically illustrated secondary strainer.

Referring now to FIG. 15, the watercraft and modified onboard water system of FIG. 1 is illustrated, the onboard water system including a schematically illustrated flow meter 2000 and a schematically illustrated secondary strainer 2002, with the strainer 340 functioning as a primary strainer. The flow meter 2000 is operatively coupled to the control 404, e.g., with one or more signal lines, to provide detected flow data to the control 404. In some examples, the flow meter 2000 is an electronic paddle flow meter. The biocide generating system 324 includes a housing 2004 (e.g., a canister) defining a chamber 2006 in which is positioned the electrode arrangement 72. The chamber 2006 has an inlet 2008 at an upstream side of the chamber 2006 and upstream of the electrode arrangement 72, and an outlet 2010 at a downstream side of the chamber 2006 and downstream of the electrode arrangement 72.

The secondary strainer 2002 is positioned at the outlet 2010 and the flow meter 2000 is positioned downstream of the secondary strainer 2002. In some examples, the secondary strainer 2002 can be removed and re-installed at the outlet 2010 simply by opening the housing 2004 to access the chamber 2006.

In alternative examples the secondary strainer is not a removable component.

The secondary strainer 2002 is positioned to collect debris that is not caught by the primary strainer 340. For example, if the watercraft 4 is retrofitted with the biocide generating system 324 after the watercraft has already been in use for some time, it is possible for biofouling to have occurred downstream of the strainer 340 and upstream of the biocide generating system 324, e.g., in the region 2012 or a portion of the region 2012.

Following the retrofitting, biocide introduced to the region 2012 via the recirculation conduit 402 can kill the accumulated biomaterial therein, causing it to dislodge and flow downstream through the onboard water system, potentially damaging or clogging portions of the onboard water system. For example, flowing debris can become lodged in the flow meter 2000, causing it to output faulty flow data to the control 400.

The strainer 2002 is configured and positioned to capture such flowing debris and prevent it from traveling further downstream where it might lodge in or damage, e.g., the flow meter 2000, the pump 342, the water reliant component(s) 344, sensors or valves positioned along the flow path, etc. In some examples, the mesh size (i.e., the size of the openings in the mesh through which water flows along the flow path) of the secondary strainer 2002 is larger than the mesh size of the primary strainer 340, such that only relatively large debris can be captured by the secondary strainer 2002 and such that water flow through the secondary strainer 2002 is only minimally impeded.

Once the debris has been captured and the onboard water system is temporally shut off, the secondary strainer 2002 can be removed (e.g., by opening the housing 2004 to access the chamber 2006 and the secondary strainer 2002 positioned at the outlet 2010) to clean off and discard the captured debris. The secondary strainer can then be, but need not be, returned to its position at the outlet 2010, and operation of the onboard water system and the biocide generating system can be resumed.

Figure 16:
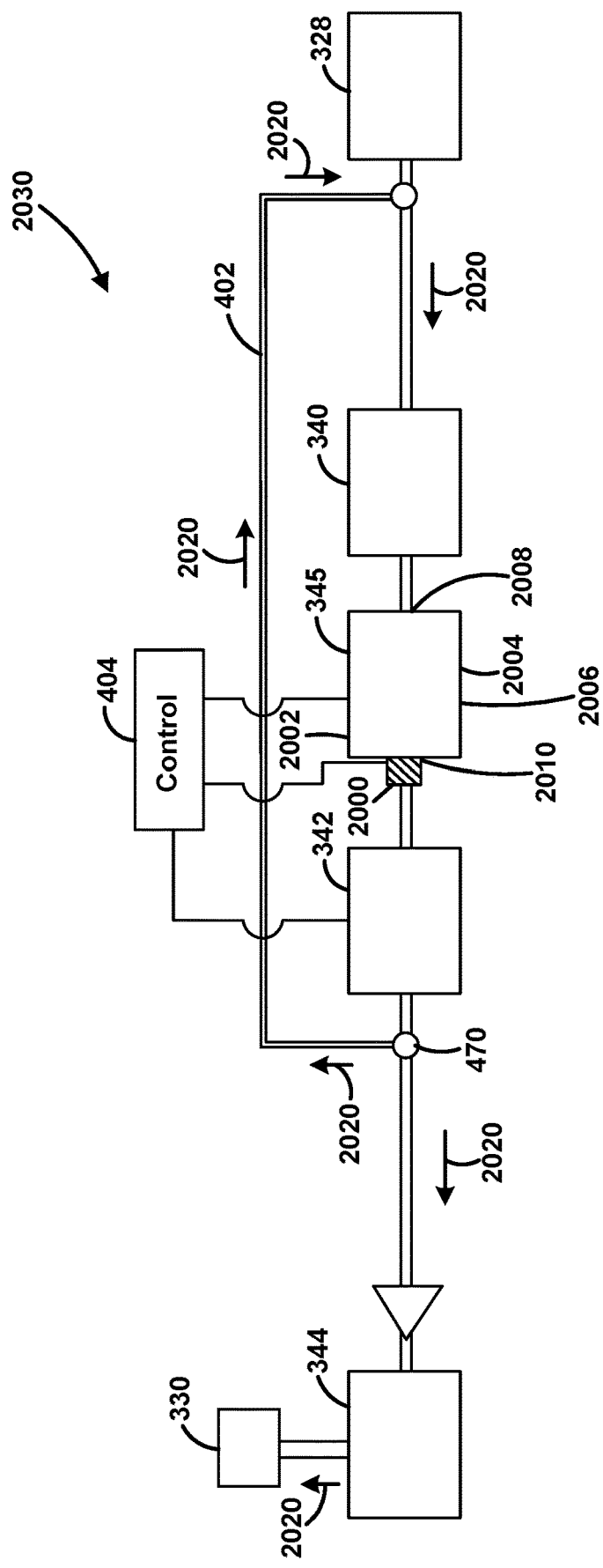
FIG. 16 is a schematic depiction of a portion of a further embodiment of an onboard water system in accordance with the present disclosure, including the secondary strainer and the flow meter.
Figure 17:
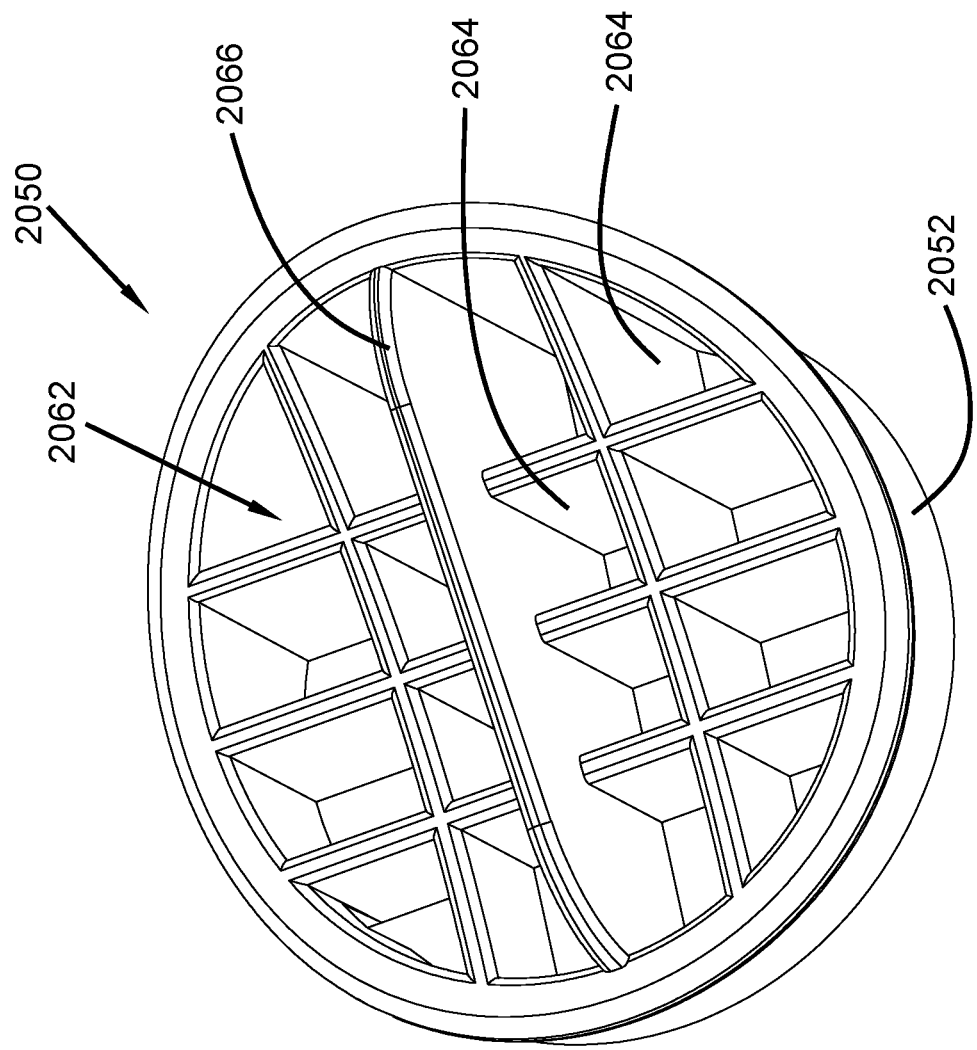
FIG. 17 is a perspective view of an example secondary strainer in accordance with the present disclosure.
Figure 19:
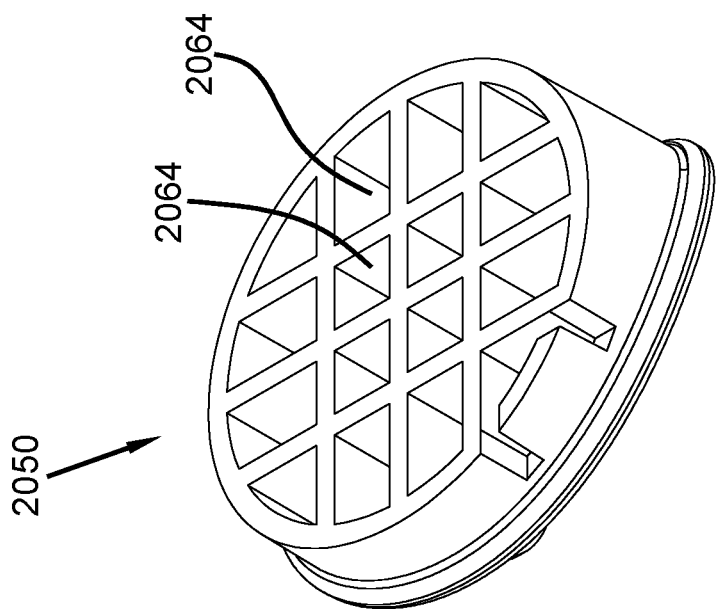
FIG. 19 is a further perspective view of the secondary strainer of FIG. 17.
Figure 18:
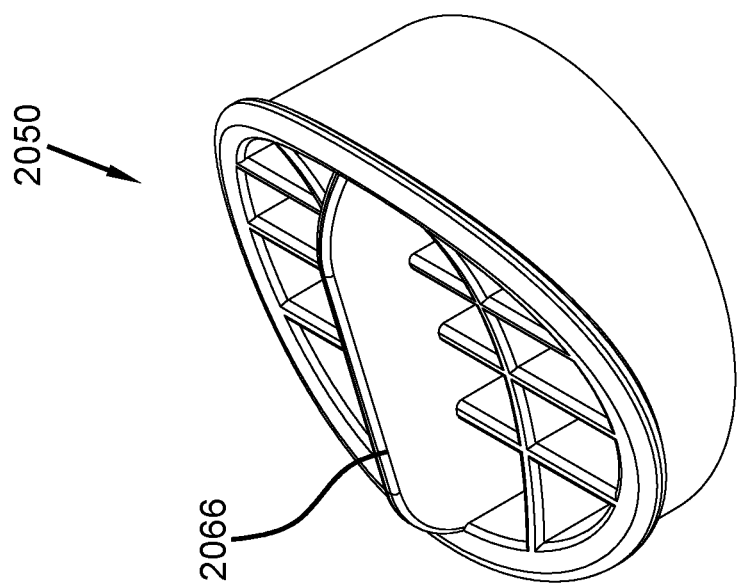
FIG. 18 is a further perspective view of the secondary strainer of FIG. 17.
Figure 21:
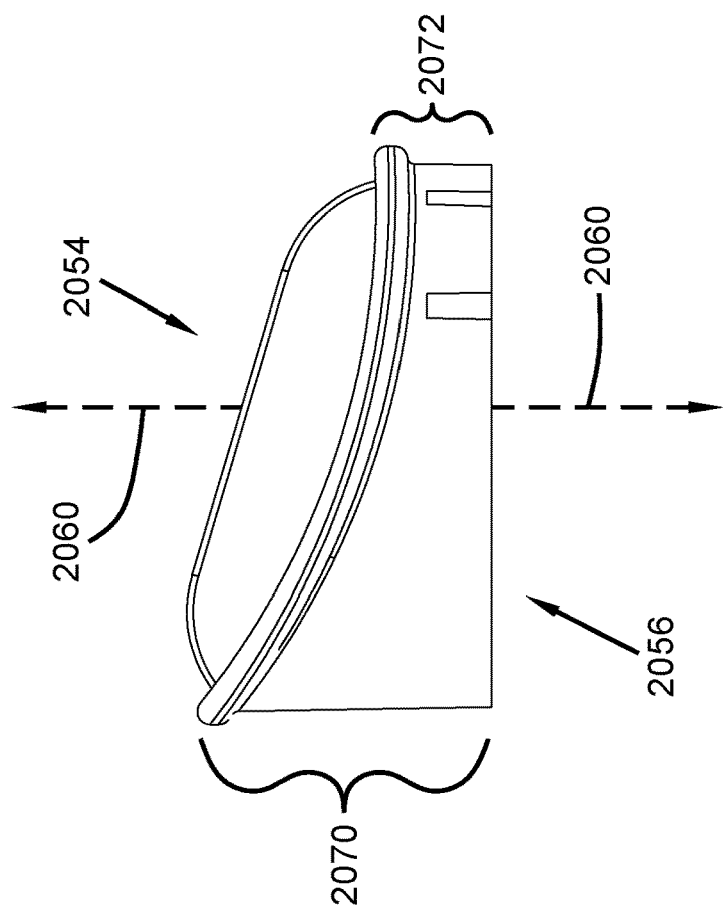
FIG. 21 is a further side view of the secondary strainer of FIG. 17.
Figure 20:
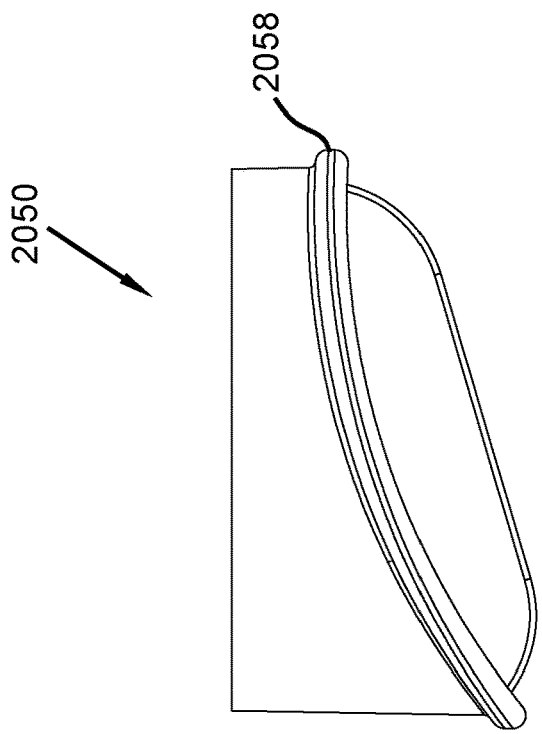
FIG. 20 is a side view of the secondary strainer of FIG. 17.
Figure 23:
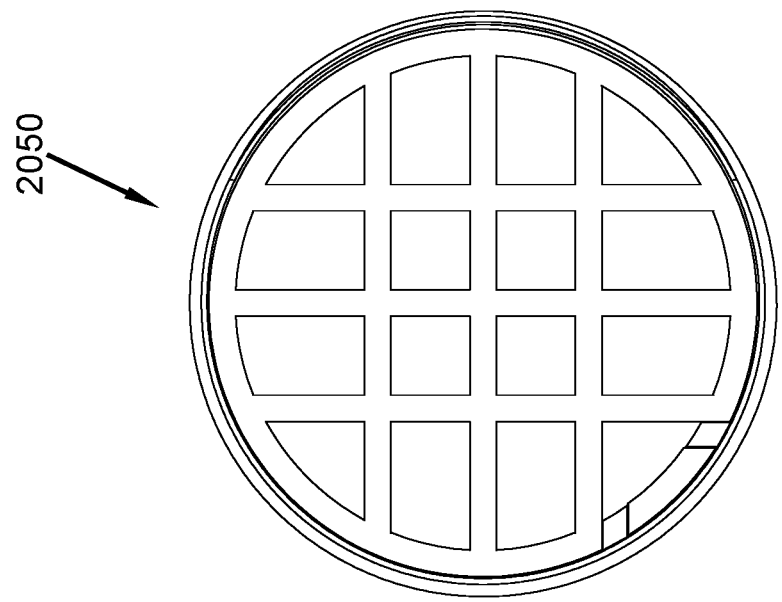
FIG. 23 is a downstream end view of the secondary strainer of FIG. 17.
Figure 22:
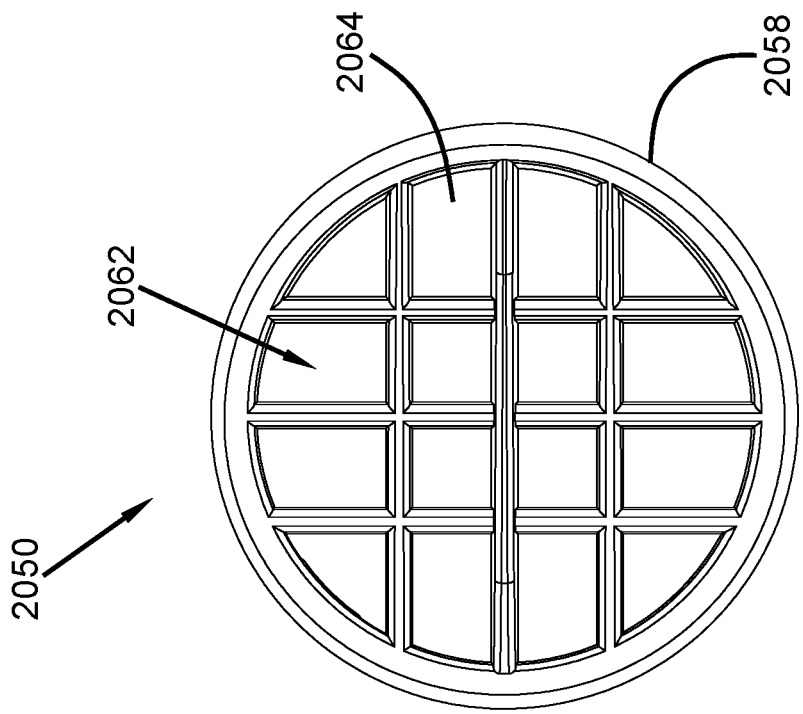
FIG. 22 is an upstream end view of the secondary strainer of FIG. 17.
Figure 24:
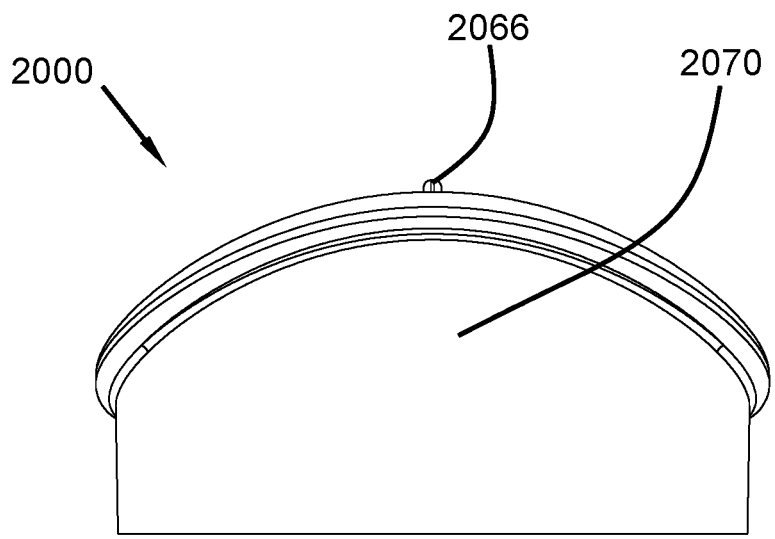
FIG. 24 is a further side view of the secondary strainer of FIG. 17.
Figure 25:
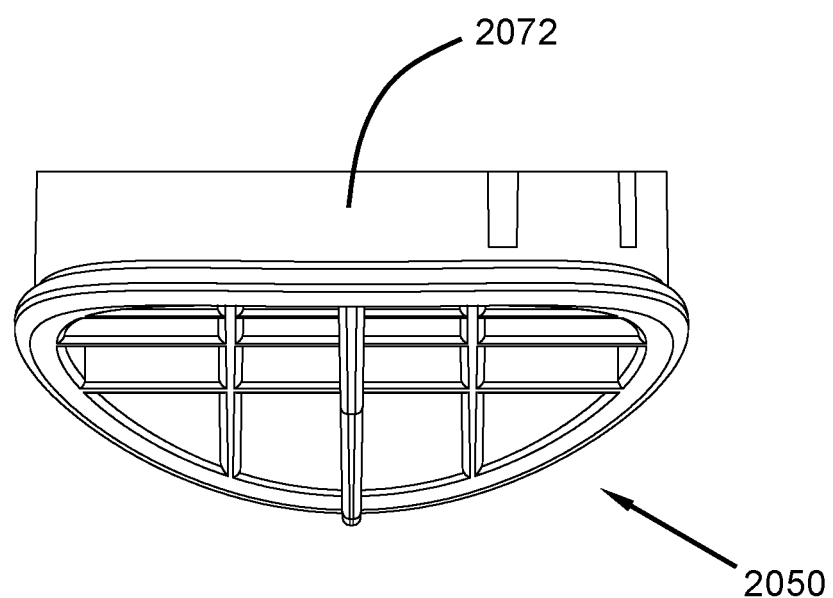
FIG. 25 is a further side view of the secondary strainer of FIG. 17.

Referring now to FIG. 16, the flow regime of an onboard water system 2300 is schematically depicted. A pump 342 is operable in a single pumping direction in which water is pumped from the water source via the THF 328. This untreated water flows (along the flow direction 2020) to the primary strainer 340 which filters the untreated water. The filtered untreated water is then selectively treated with biocide by the electrolytic cell 345 (assuming biocide is being generated). The secondary strainer 2002 is positioned at the outlet 2010 of the chamber 2006 and can collect debris (e.g., debris dislodged during a purge of the onboard water system) that enters the flow path between the primary strainer 340 and the secondary strainer 2002, thereby protecting the flow meter 2000 from such debris.

Once the debris has been captured by the secondary strainer 2002 and the onboard water system is temporally shut off, the secondary strainer 2002 can be removed (e.g., by opening the housing 2004 to access the chamber 2006 and the secondary strainer 2002 positioned at the outlet 2010) to clean off the captured debris. The secondary strainer can then be, but need not be, returned to its position at the outlet 2010, and operation of the onboard water system and the biocide generating system can be resumed. On the high pressure side of the pump 342 the biocide treated water is furcated at a furcation fitting 470 (e.g., a bifurcation fitting) to one or more water-reliant components 344. Pre-retrofitting build-up of biomaterial positioned in the flow stream between the flow meter 2000 and downstream thereof can be discharged through the port 330 and/or captured by the primary strainer 340. The recirculation conduit 402 directs the treated water to a junction 472 that is upstream of the strainer 340. At the junction 472, the treated water comingles with untreated water being drawn through the THF 328, such that the flow conduit segment 474 and the strainer 340 are treated with biocide to reduce biofouling in those components. It should be appreciated that the junction 472 can be positioned such that, upon shutting off of the pump 342, residual treated water in the recirculation conduit 402 can be discharged through the THF 328 on the action of gravity and/or a residual pressure differential in the flow regime.

Referring now to FIGS. 17-25, an example secondary strainer 2050 is depicted. The strainer 2050 can be used as the strainer 2002 described above. The overall shape and size of the strainer 2050 is selected such that it can be seated and mounted at the outlet of the chamber 2006. The strainer 2050 includes features that allow it to be easily removed (for cleaning) and re-installed at the outlet of the chamber 2006.

The strainer 2050 includes a round body 2052 extending along an axis 2060 between an upstream end 2054 of the strainer 2050 and a downstream end 2056 of the strainer 2050. An annular lip 2058 is configured to engage a wall of the chamber 2006 adjacent the outlet 2010 of the chamber 2006. The upstream end 2054 is canted at an oblique angle relative to the axis 2060 and also defines a concavity. The concavity and the oblique orientation of the upstream end 2054 relative to the axis 2060 can help hold debris caught by the mesh 2062. For example, even when the pump is off and flow through the strainer 2050 reduces or goes to zero, the concavity and greater deepness of the side 2070 compared with the opposite side 2072 can stop debris from falling off the strainer 2050, the mesh functioning as a catch. The openings 2064 of the mesh extend all the way through the strainer 2050 (allowing water to flow through relatively unimpeded by the mesh) in the axial direction and are relatively large such that only relatively large debris (e.g., particles having smallest outer diameters on the order of about 4 millimeters to about 10 millimeters (e.g., about 6 millimeters) or greater) can be stopped and caught by the mesh 2062. One of the mesh walls 2066 (in this example, a central mesh wall) axially protrudes in the upstream direction and can serve as a finger grasp or hand hold for removing and installing the strainer 2050.

Figure 26:
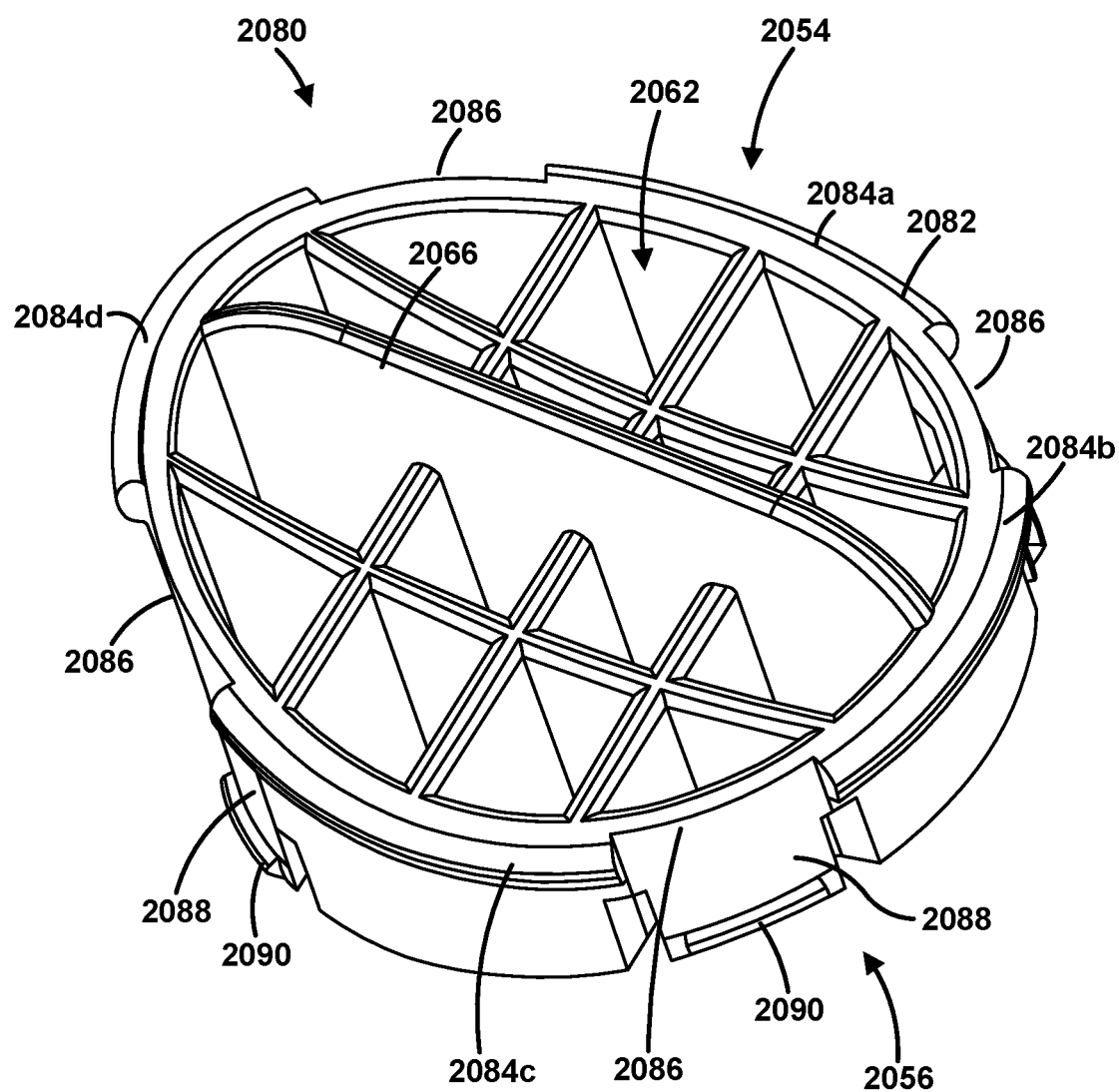
FIG. 26 is a perspective view of a further example secondary strainer in accordance with the present disclosure.

Referring now to FIG. 26, a further embodiment of a secondary strainer 2080 is depicted. The strainer 2080 has several features in common with the strainer 2050. In the interest of brevity, only differences from the strainer 2050 will be described. The lip 2082 of the strainer 2080 is a segmented lip including lip segments 2084a, 2084b, 2084c, and 2084d with intermediate lip discontinuities 2086. At each discontinuity 2086, a resilient cantilever arm 2088 extends towards the downstream end 2056 of the strainer 2080. At the free end of each cantilever arm 2088 is a latching projection 2090. When installing the strainer 2080, the free ends of the cantilever arms 2088 can flex toward the axis and then flex back to engage a wall at the outlet of the chamber of the biocide generator. The flexibly resilient nature of the cantilever arms 2088 also allows for relatively easy disengagement of the cantilever arms 2088 from the wall of the outlet when removing the strainer 2080 (e.g. for cleaning and discarding debris).

Example Embodiments

According to a $1^{st}$ example embodiment, there is provided a biocide generating system for inhibiting bio-fouling within a water system of a watercraft, the water system being configured to draw water from a water source on which the watercraft is supported through at least a first port positioned in a body or hull of the watercraft, the biocide generating system defining an upstream to downstream direction corresponding to a direction of flow when water is being drawn through the first port into the water system, the biocide generating system comprising: an electrode arrangement adapted to be incorporated as part of an electrolytic cell through which water drawn from the water source flows; and a recirculation conduit having a first end positioned downstream of the electrode arrangement and a second end positioned proximate the first port such that the recirculation conduit is configured to discharge water containing biocide through the first port.

According to a $2^{nd}$ example embodiment, there is provided the first example embodiment, further comprising a storage tank, the storage tank configured to store water treated with biocide.

According to a $3^{rd}$ example embodiment, there is provided any of the $1^{st}$ or $2^{nd}$ example embodiments, wherein the water system further comprises one or more valves and/or one or more through-hull fittings and/or one or flow furcation fittings, wherein at least one of the one or more through-hull fittings defines one of the at least one port.

According to a $4^{th}$ example embodiment, there is provided a biocide generating system for inhibiting bio-fouling of an onboard water system of a watercraft, the water system being configured to draw water from a water source on which the watercraft is supported through an inlet positioned in a body or hull of the watercraft, the biocide generating system comprising: an electrode arrangement adapted to be incorporated as part of an electrolytic cell through which water drawn from the water source flows; and a biocide distribution conduit terminating at an outlet positioned in the body or hull of the watercraft, the outlet being positioned relative to the inlet such that biocide discharged from the watercraft into the water source through the outlet is drawn through the inlet.

According to a $5^{th}$ example embodiment, there is provided the $4^{th}$ example embodiment, wherein the water system includes a flow diverter that provides for controllable flow of the drawn water to one or both of a water-reliant component of the onboard water system and the electrode arrangement.

According to a $6^{th}$ example embodiment, there is provided any of the $4^{th}$ or $5^{th}$ example embodiments, wherein the inlet and the outlet are integrated in a single through-hull fitting.

According to a $7^{th}$ example embodiment, there is provided any of the $4^{th}$ or $5^{th}$ example embodiments, wherein the inlet and the outlet are included in separate through-hull fittings.

According to an $8^{th}$ example embodiment, there is provided a biocide generating system for inhibiting bio-fouling of an onboard water system of a watercraft, the water system being configured to draw water from a water source on which the watercraft is supported through an inlet positioned in a body or hull of the watercraft, the biocide generating system comprising: a conduit arrangement that defines a first flow path extending from the inlet to an electrode arrangement and from the electrode arrangement to an outlet, and a second flow path extending from the inlet to a water-reliant component of the onboard water system, wherein the outlet is positioned relative to the inlet such that biocide discharged from the watercraft into the water source through the outlet is drawn through the inlet.

According to a $9^{th}$ example embodiment, there is provided the $8^{th}$ example embodiment, wherein the second flow path bypasses the electrode arrangement.

According to a $10^{th}$ example embodiment, there is provided the $8^{th}$ example embodiment, wherein the second flow path does not bypass the electrode arrangement.

According to an 11th example embodiment, there is provided a method of bio-inhibiting an onboard water system of a watercraft, the water system being configured to draw water from a water source on which the watercraft is supported through an inlet positioned in a body or hull of the watercraft, the method comprising: pumping water from the water source through the inlet such that the water is pumped to an electrode arrangement adapted to be incorporated as part of an electrolytic cell, the electrolytic cell generating biocide in the water such that the water becomes treated water; feeding at least a first portion of the treated water to an outlet positioned in the body or hull of the boat such that the at least a first portion of the treated water flows out of the outlet into the water source; and pumping at least a second portion of the at least a first portion of the treated water into the onboard water system through the inlet.

According to a 12th example embodiment, there is provided the 11th example embodiment, further comprising feeding at least a third portion of the treated water to a water-reliant component of the onboard water system. wherein the biocide includes chlorine.

According to a 13th example embodiment, there is provided any of the 1st through 12th example embodiments, wherein the biocide includes chlorine.

According to a 14th example embodiment, there is provided a biocide generating system for inhibiting bio-fouling within a water system of a watercraft, the water system being configured to draw water from a water source on which the watercraft is supported through at least a first port positioned in a body or hull of the watercraft, the biocide generating system defining an upstream to downstream direction corresponding to a direction of flow when water is being drawn through the first port into the water system, the biocide generating system comprising: an electrode arrangement adapted to be incorporated as part of an electrolytic cell through which water drawn from the water source flows; a flow meter positioned downstream of the electrode arrangement to detect metered flow out of the electrolytic cell; and a strainer positioned to stop debris travelling downstream in water treated by the electrolytic cell and stop the debris from contacting or passing the flow meter.

According to a 15th example embodiment, there is provided the 14th example embodiment, wherein the electrode arrangement is at least partially positioned within a chamber having a flow inlet and a flow outlet, wherein the strainer is positioned at the outlet of the chamber, and wherein the flow meter is positioned downstream of the strainer.

According to a 16th example embodiment, there is provided the 15th example embodiment, wherein the strainer is accessible and removable from the biocide generating system via the chamber.

According to a 17th example embodiment, there is provided the 14th example embodiment, wherein the strainer includes one or more cantilever latch arms.

According to an 18th example embodiment, there is provided the 14th example embodiment, wherein the strainer includes a protruding hand hold.

According to a 19th example embodiment, there is provided the 14th example embodiment, wherein the strainer is a secondary strainer, and wherein the system further includes a primary strainer positioned upstream of the electrode arrangement.

According to a 20th example embodiment, there is provided the 19th example embodiment, wherein the primary strainer and the electrode arrangement are components of an integrated unit.

According to a 21st example embodiment, there is provided the 19th example embodiment, wherein a mesh size of the primary strainer is smaller than a mesh size of the secondary strainer.

According to a 22nd example embodiment, there is provided a biocide generating system for inhibiting bio-fouling within a water system of a watercraft, the water system being configured to draw water from a water source on which the watercraft is supported through at least a first port positioned in a body or hull of the watercraft, the biocide generating system defining an upstream to downstream direction corresponding to a flow path when water is being drawn through the first port into the water system, the biocide generating system comprising: an electrode arrangement adapted to be incorporated as part of an electrolytic cell through which water drawn from the water source flows; a flow meter positioned to detect metered flow along the flow path; a first strainer positioned upstream of the electrode arrangement; and a second strainer positioned downstream of the first strainer and upstream of the flow meter to stop debris travelling downstream from the first strainer from contacting or passing the flow meter.

According to a 23rd example embodiment, there is provided the 22nd example embodiment, wherein the flow meter is positioned upstream of the electrolytic cell.

According to a 24th example embodiment, there is provided the 23rd example embodiment, wherein the flow meter is positioned downstream of the electrolytic cell.

According to a 25th example embodiment, there is provided a biocide generating system for inhibiting bio-fouling within a water system of a watercraft, the water system being configured to draw water from a water source on which the watercraft is supported through each of a first port and a second port positioned in a body or hull of the watercraft, comprising: an electrode arrangement adapted to be incorporated as part of an electrolytic cell through which water drawn from the water source through each of the first and the second ports flows; a first strainer through which water drawn through the first port flows before reaching the electrode arrangement; a second strainer through which water drawn through the second port flows before reaching the electrode arrangement; a first recirculation conduit configured to feed water containing biocide generated by the electrolytic cell to the first strainer; and a second recirculation conduit configured to feed water containing biocide generated by the electrolytic cell to the second strainer.

According to a 26th example embodiment, there is provided the 25th example embodiment, wherein the first recirculation conduit is further configured to discharge water containing biocide generated by the electrolytic cell through the first port; wherein the second recirculation conduit is configured to discharge water containing biocide through the second port; and wherein the biocide generating system further comprises a controllable pump usable to perform the drawing of the water through the first and second ports, and/or the feeding of the water containing biocide to the first and second strainers, and/or the discharging of the water containing biocide through the first and second ports, the controllable pump being operable in a forward mode in which the pump acts to draw water from the water source into the water system through the first port and a reverse mode in which the pump acts to draw water from the water source into the water system through the second port.

According to a 27th example embodiment, there is provided the 26th example embodiment, wherein the first recirculation conduit is further configured to discharge water containing biocide generated by the electrolytic cell through the first port; wherein the second recirculation conduit is configured to discharge water containing biocide through the second port; and wherein the biocide generating system further comprises at least first and second controllable pumps that can be operatively coordinated to perform the drawing of the water through the first and second ports, and/or the feeding of the water containing biocide to the first and second strainers, and/or the discharging of the water containing biocide through the first and second ports, the first and second pumps being controllable in a cooperative fashion including a first mode in which the first pump is active and the second pump is idle and the first pump acts to draw water from the water source into the water system through the first port, and a second mode in which the second pump is active and the first pump is idle and the second pump acts to draw water from the water source into the water system through the second port.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. A biocide generating system for inhibiting bio-fouling within a water system of a watercraft, the water system being configured to draw water from a water source on which the watercraft is supported through an inlet of a through-hull fitting positioned in a hull of the watercraft, the biocide generating system defining an upstream to downstream direction corresponding to a direction of flow when water is being drawn through the inlet into the water system, the biocide generating system comprising:
   a housing;
   an electrode arrangement positioned in the housing, the housing and the electrode arrangement being adapted to form an electrolytic cell through which water drawn from the water source through the inlet flows;
   a strainer through which the water drawn through the inlet flows, the strainer being positioned upstream of the electrode arrangement; and
   a recirculation conduit having a first end positioned downstream of the electrode arrangement and a second end positioned such that the recirculation conduit discharges water containing biocide through an outlet of the through-hull fitting into the water source, the biocide being generated by the electrolytic cell.

2. The biocide generating system of claim 1, comprising at least one pump being located and operable to draw the water through the inlet and discharge the water containing biocide through the outlet.

3. The biocide generating system of claim 1, comprising at least two pumps being located and operative to draw the water through the inlet and discharge the water containing biocide through the outlet.

4. The biocide generating system of claim 1, wherein the electrode arrangement is configured to generate chlorine or a chlorine derivative when current is supplied to the electrode arrangement and the water drawn through the inlet flowing through the electrode arrangement is salt water.

5. The biocide generating system claim 1, further comprising a diverter configured to selectively direct the water drawn through the inlet to a water-reliant component of the water system.

6. The biocide generating system of claim 1, further comprising a storage tank for storing the water containing biocide.

7. A method of bio-inhibiting an onboard water system of a watercraft, the water system being configured to draw water from a water source on which the watercraft is supported through an inlet of a through-hull fitting positioned in a hull of the watercraft, the method comprising:
   pumping untreated water from the water source through the inlet such that the untreated water is pumped through a strainer of the onboard water system and to a housing including an electrode arrangement adapted to form an electrolytic cell that generates biocide in the untreated water such that the untreated water becomes treated water;
   feeding at least a first portion of the treated water to the strainer via a recirculation conduit; and
   discharging, via the recirculation conduit, at least a second portion of the treated water through an outlet of the through-hull fitting into the water source.

8. The method of claim 7, further comprising feeding at least a third portion of the treated water to a water-reliant component of the onboard water system.

9. A method of bio-inhibiting an onboard water system of a watercraft, the water system being configured to draw water from a water source on which the watercraft is supported through each of a first port and a second port positioned in a body or hull of the watercraft, the method comprising:
   alternating between:
      i) pumping first untreated water from the water source through the first port such that the first untreated water is pumped through a first strainer of the onboard water system and to a housing including an electrode arrangement adapted to form an electrolytic cell that generates biocide in the first untreated water such that the first untreated water becomes first treated water; and feeding at least a first portion of the first treated water to a second strainer of the onboard water system via a first recirculation conduit; and
      ii) pumping second untreated water from the water source through the second port such that the second untreated water is pumped through the second strainer of the onboard water system and to the housing including the electrode arrangement that generates biocide in the second untreated water such that the second untreated water becomes second treated water; and feeding at least a first portion of the second treated water to the first strainer of the onboard water system via a second recirculation conduit.

10. The method of claim 9, further comprising feeding at least a second portion of the first treated water and/or the second treated water to a water-reliant component of the onboard water system.

11. The method of claim 10, further comprising discharging at least a third portion of the first treated water through the second port and/or discharging at least a third portion of the second treated water through the first port.

12. A method, comprising:
   retro-fitting an onboard water system of a watercraft with a biocide generating system defining an upstream to downstream direction, the biocide generating system being configured to generate biocide in water flowing into the onboard water system from a water source on which the watercraft is supported through at least a first port positioned in a body or hull of the watercraft, the biocide generating system including:

a housing including an electrode arrangement adapted to form an electrolytic cell through which water drawn from the water source flows, the electrode arrangement being at least partially positioned within a chamber of the housing, the chamber having a flow inlet and a flow outlet;

a flow meter positioned downstream of the electrode arrangement to detect metered flow out of the electrolytic cell; and a strainer positioned at the outlet of the chamber and upstream of the flow meter.

13. The method of claim 12, further comprising, subsequent to the retro-fitting, activating the electrolytic cell such that the electrolytic cell becomes active.

14. The method of claim 13, further comprising, subsequent to the activating:

deactivating the electrolytic cell; and subsequent to the deactivating, removing the strainer from the outlet to remove debris collected by the strainer when the electrolytic cell was active.

15. The method of claim 14, further comprising, subsequent to the removing:

installing the strainer at the outlet of the chamber and upstream of the flow meter.

16. The method of claim 15, wherein the strainer includes one or more cantilever latch arms, and wherein removing the strainer includes flexing the one or more cantilever latch arms from engagement with a wall of the chamber.

17. The method of claim 12, wherein the strainer is a secondary strainer, and wherein the onboard water system further includes a primary strainer positioned upstream of the electrode arrangement.

18. The method of claim 17, wherein a mesh size of the primary strainer is smaller than a mesh size of the secondary strainer.

19. The method of claim 14, wherein the strainer is a secondary strainer, wherein the onboard water system further includes a primary strainer positioned upstream of the electrode arrangement, and wherein the secondary strainer collects debris that accumulates in the on-board water system downstream of the primary strainer and upstream of the secondary strainer.

20. A method, comprising:

pumping untreated water from a water source on which a watercraft is supported into the watercraft through a through-hull fitting of a hull of the watercraft;

treating the untreated water onboard the watercraft forming treated water, the treating including pumping the untreated water through a housing including an electrode arrangement adapted to form an electrolytic cell that generates biocide in the untreated water;

discharging a first portion of the treated water into the water source through the through-hull fitting such that the first portion of the treated water becomes discharged water; and pumping at least some of the discharged water back into the watercraft.

21. The method of claim 20, further comprising pumping at least some of the treated water through a heat exchanger or a chiller onboard the watercraft.

22. The method of claim 20, further comprising pumping at least some of the discharged water through a strainer onboard the watercraft.

* * * * *